United States Patent
Kashiwagi et al.

(10) Patent No.: US 11,107,245 B2
(45) Date of Patent: Aug. 31, 2021

(54) IMAGE PROCESSING DEVICE, RANGING DEVICE, AND METHOD

(71) Applicant: KABUSHIKI KAISHA TOSHIBA, Tokyo (JP)

(72) Inventors: Masako Kashiwagi, Ageo Saitama (JP); Nao Mishima, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 16/812,468

(22) Filed: Mar. 9, 2020

(65) Prior Publication Data

US 2021/0082146 A1    Mar. 18, 2021

(30) Foreign Application Priority Data

Sep. 12, 2019 (JP) .............................. JP2019-166563

(51) Int. Cl.
*G06K 9/00* (2006.01)
*G06T 7/77* (2017.01)
*G06T 7/35* (2017.01)
*G06T 5/20* (2006.01)

(52) U.S. Cl.
CPC .................. *G06T 7/77* (2017.01); *G06T 5/20* (2013.01); *G06T 7/35* (2017.01)

(58) Field of Classification Search
None
See application file for complete search history.

(56) References Cited

U.S. PATENT DOCUMENTS

| | | | |
|---|---|---|---|
| 8,514,491 B2* | 8/2013 | Duparre | G02B 13/001 359/618 |
| 9,749,532 B1* | 8/2017 | Hinkel | H04N 5/35572 |
| 2008/0174678 A1* | 7/2008 | Solomon | G06T 7/194 348/231.99 |
| 2008/0212838 A1* | 9/2008 | Frigerio | G06T 7/269 382/107 |

(Continued)

FOREIGN PATENT DOCUMENTS

| JP | 2020-26990 A | 2/2020 |
|---|---|---|
| JP | 2020-148483 A | 9/2020 |

OTHER PUBLICATIONS

Carvalho et al., "Deep Depth from Defocus: how can defocus blur improve 3D estimation using dense neural networks?" arXiv:1809.01567v2, pp. 1-18 (Sep. 6, 2018).

(Continued)

*Primary Examiner* — Shervin K Nakhjavan
(74) *Attorney, Agent, or Firm* — Finnegan, Henderson, Farabow, Garrett & Dunner L.L.P.

(57) ABSTRACT

According to one embodiment, an image processing device includes first storage and a processor. The first storage is configured to store a statistical model generated by learning of bokeh that occurs in a first image affected by aberration of a first optical system and varies non-linearly in accordance with a distance to a subject in the first image. The processor is configured to acquire a second image affected by aberration of a second optical system, input the acquired second image into the statistical model corresponding to a lens used in the second optical system and acquire distance information indicating a distance to a subject in the second image.

15 Claims, 23 Drawing Sheets

(56) References Cited

U.S. PATENT DOCUMENTS

| | | | |
|---|---|---|---|
| 2010/0157127 A1* | 6/2010 | Takayanagi | H04N 5/23293 348/333.02 |
| 2011/0242372 A1* | 10/2011 | Kosaka | H04N 9/045 348/242 |
| 2012/0044400 A1* | 2/2012 | Okada | H04N 5/23293 348/333.01 |
| 2012/0078586 A1* | 3/2012 | Alon | H04N 5/2254 703/1 |
| 2012/0242867 A1* | 9/2012 | Shuster | G01B 11/24 348/240.2 |
| 2013/0169595 A1* | 7/2013 | Chang | G06K 9/00 345/175 |
| 2014/0063234 A1* | 3/2014 | Nobayashi | H04N 7/18 348/135 |
| 2014/0152886 A1* | 6/2014 | Morgan-Mar | H04N 5/23229 348/349 |
| 2015/0138423 A1* | 5/2015 | Laroia | G02B 17/008 348/340 |
| 2015/0178970 A1* | 6/2015 | Pham | G06K 9/6256 382/190 |
| 2016/0093032 A1* | 3/2016 | Lei | G06T 11/00 382/264 |
| 2017/0184770 A1* | 6/2017 | Weichelt | H04N 5/225 |
| 2019/0244379 A1* | 8/2019 | Venkataraman | G06T 7/55 |
| 2020/0051264 A1 | 2/2020 | Mishima et al. | |
| 2020/0265565 A1* | 8/2020 | Hwang | G06T 7/11 |
| 2020/0294260 A1 | 9/2020 | Kashiwagi et al. | |

OTHER PUBLICATIONS

Trouvé et al., "Passive depth estimation using chromatic aberration and a depth from defocus approach," Applied Optics, vol. 52, No. 29, pp. 7152-7164 (Oct. 10, 2013).

Atif et al., "Optimal depth estimation from a single image by computational imaging using chromatic aberrations," XP009182402, ISBN: 978-3-86644-927-5 (Jan. 1, 2012), pp. 23-34.

Cristafalo et al., "Out-of-focus: Learning Depth from Image Bokeh for Robotic Perception," arXiv:1705.01152v1 (May 2, 2017), pp. 1-6.

He et al., "Learning Depth from Single Images with Deep Neural Network Embedding Focal Length," arXiv:1803.10039v1 (Mar. 27, 2018), pp. 1-14.

\* cited by examiner

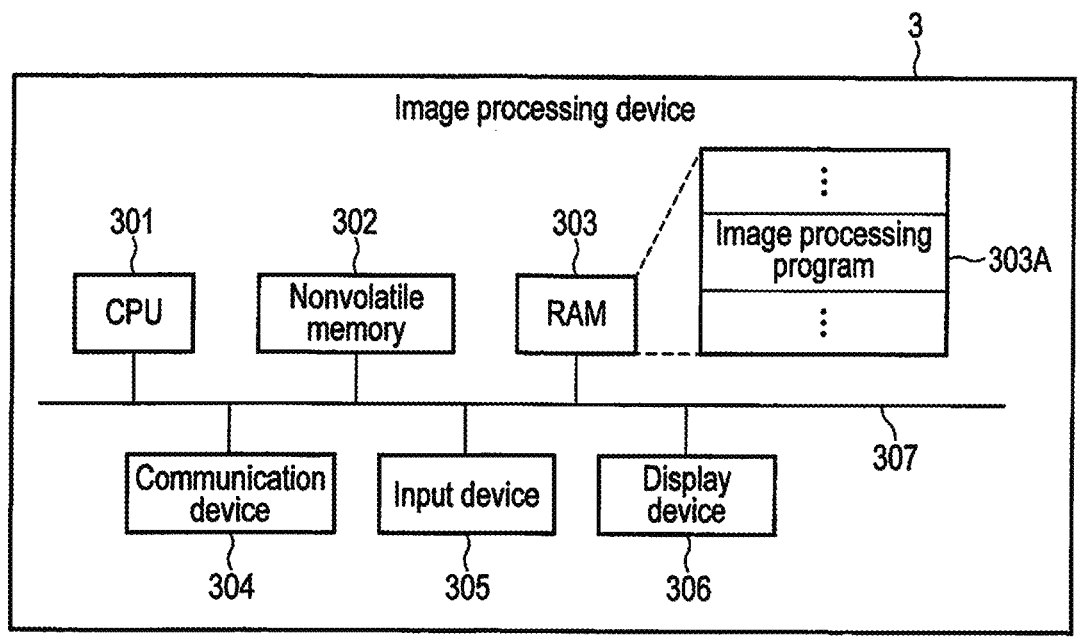
F I G. 2
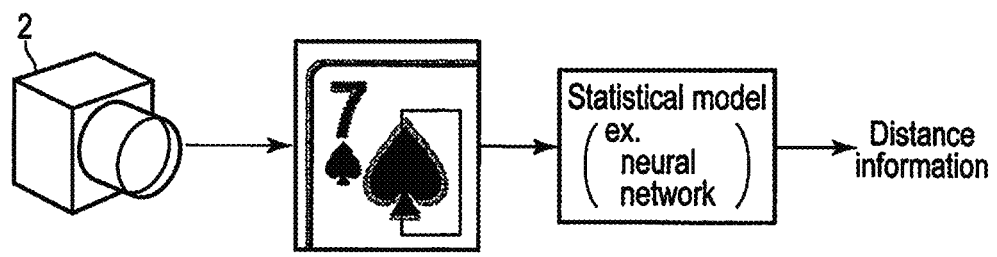
F I G. 3

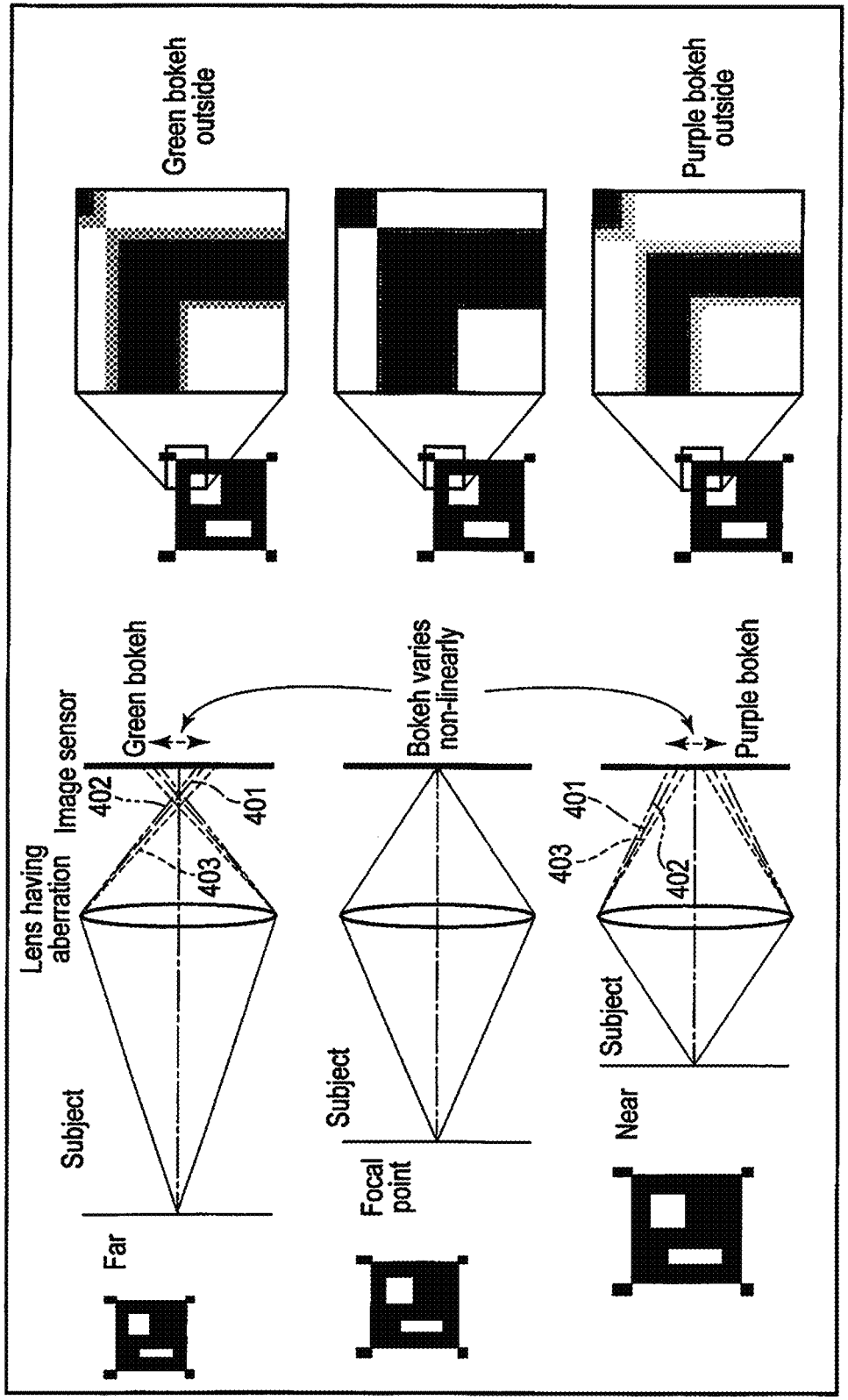
F I G. 5

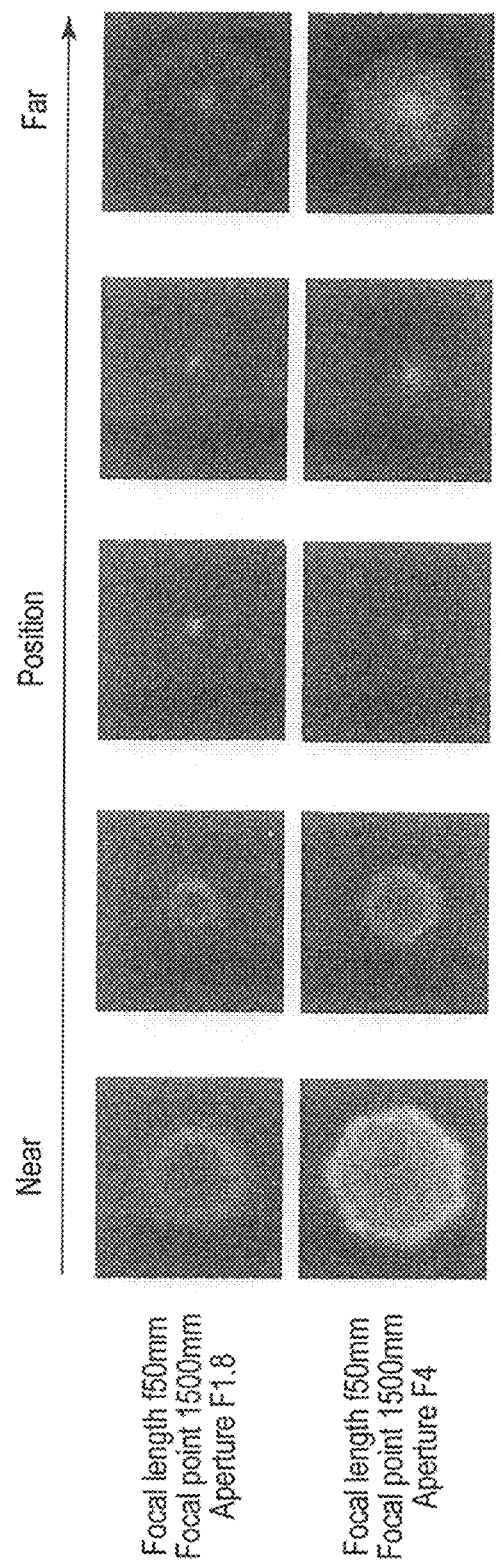
F I G. 6

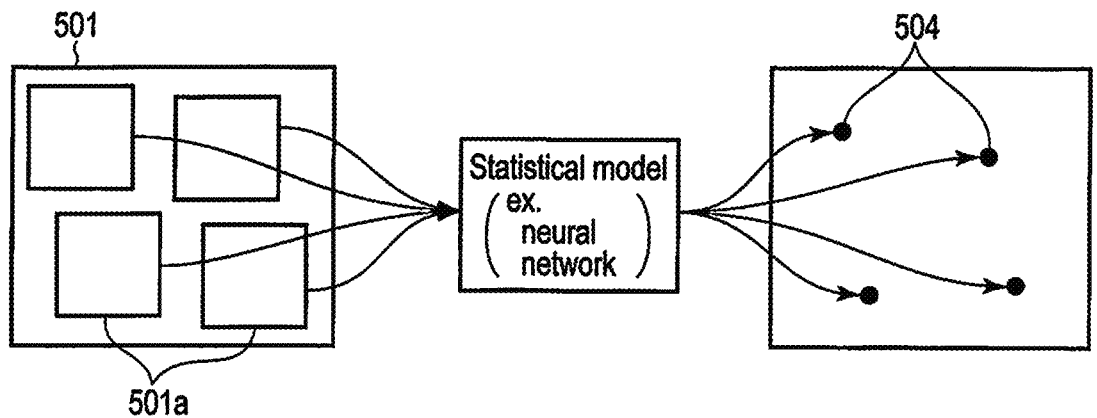
F I G. 13
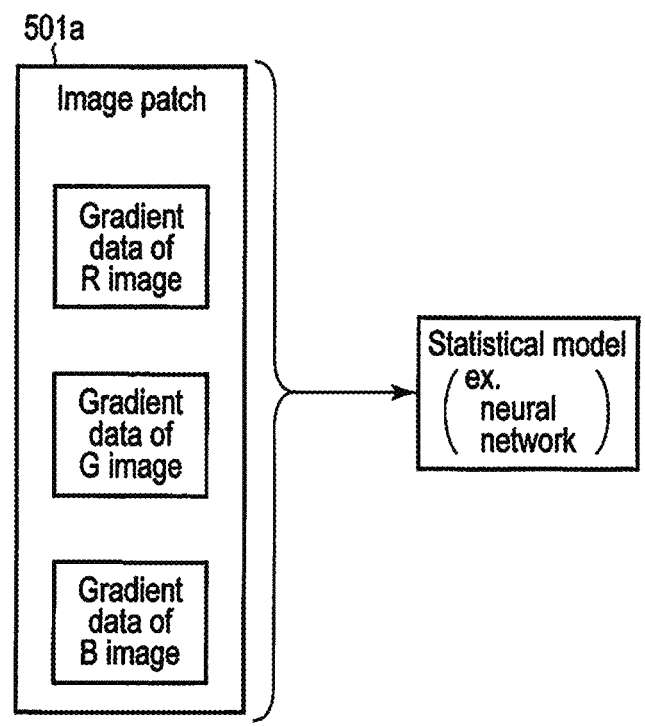
F I G. 14

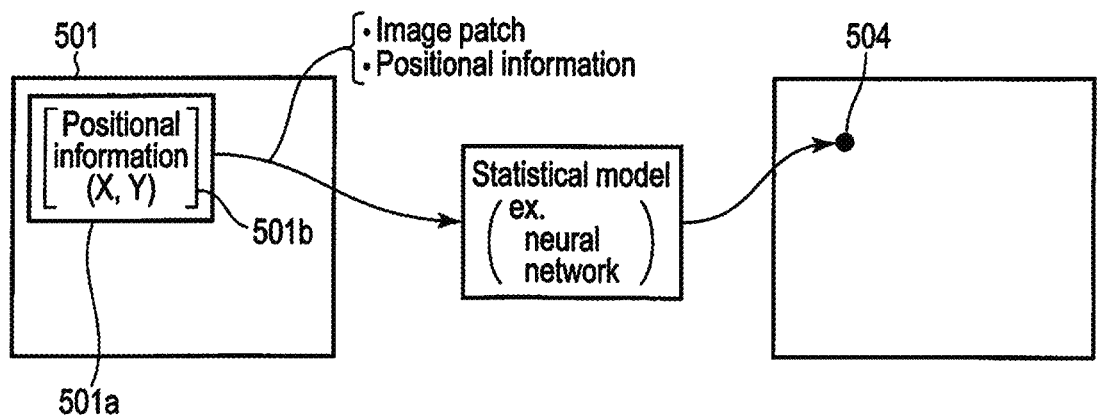
F I G. 15

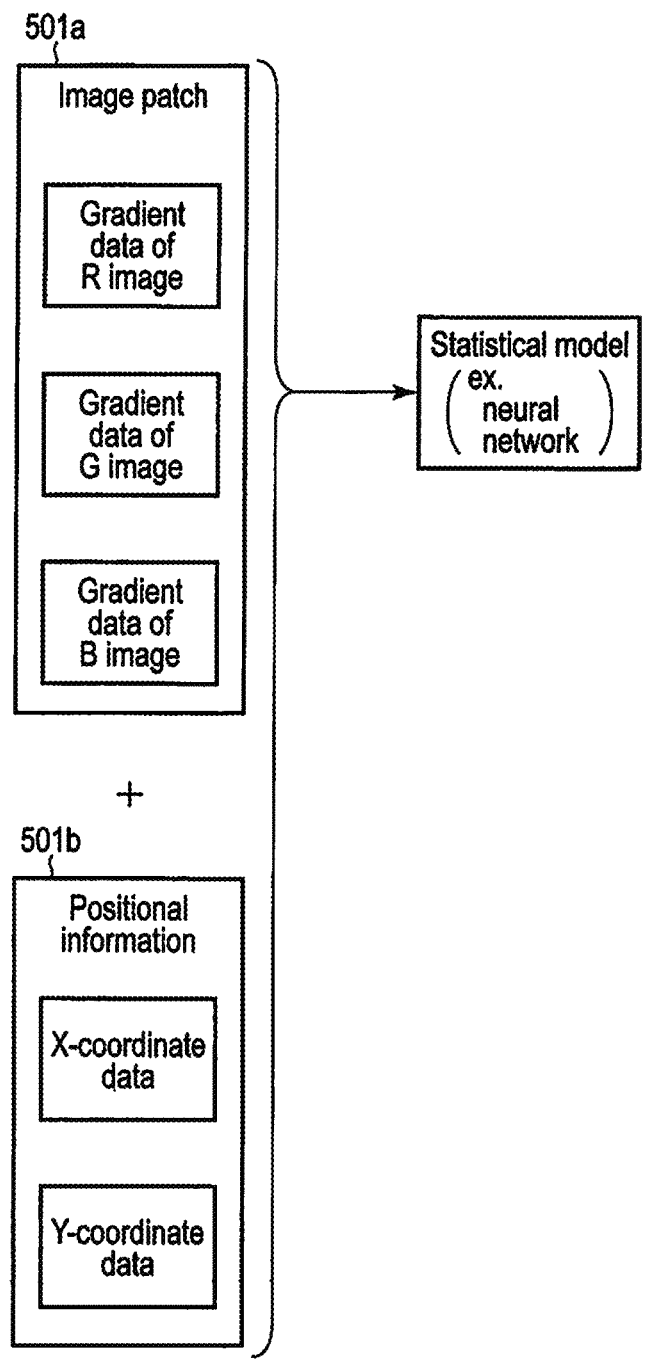
F I G. 16

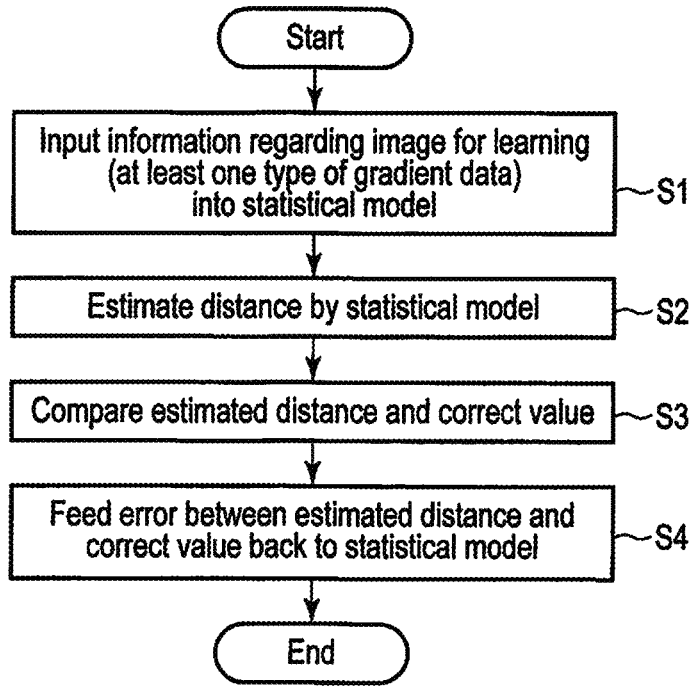
F I G. 20
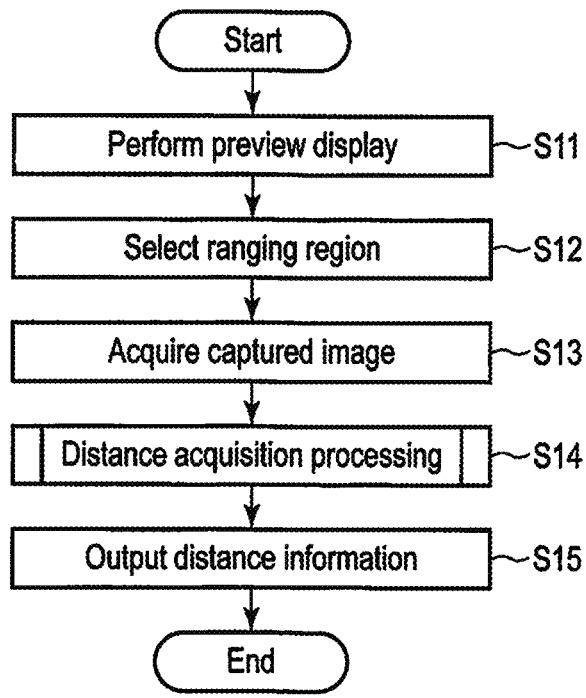
F I G. 21

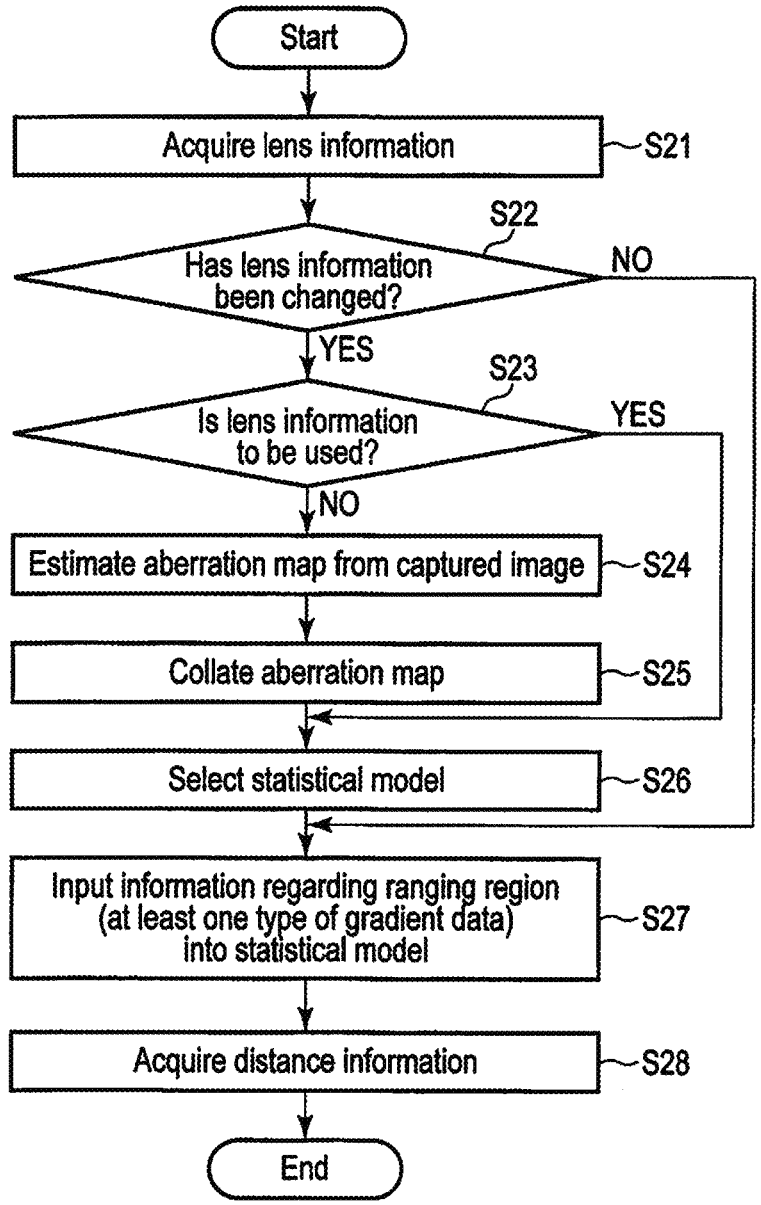
F I G. 22

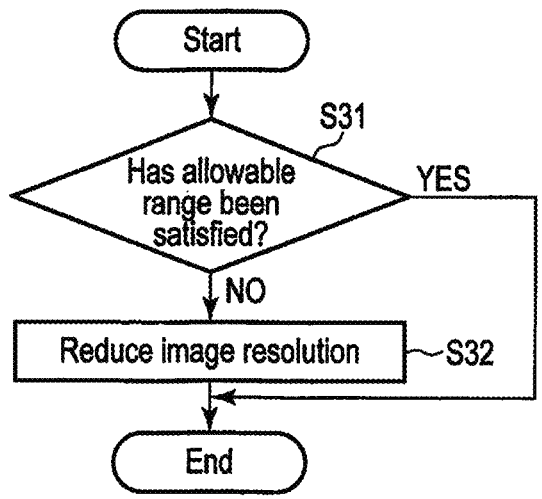
F I G. 23
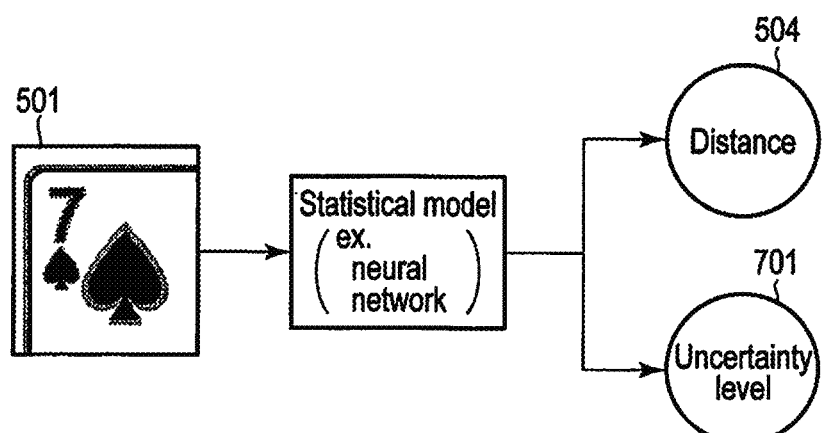
F I G. 24

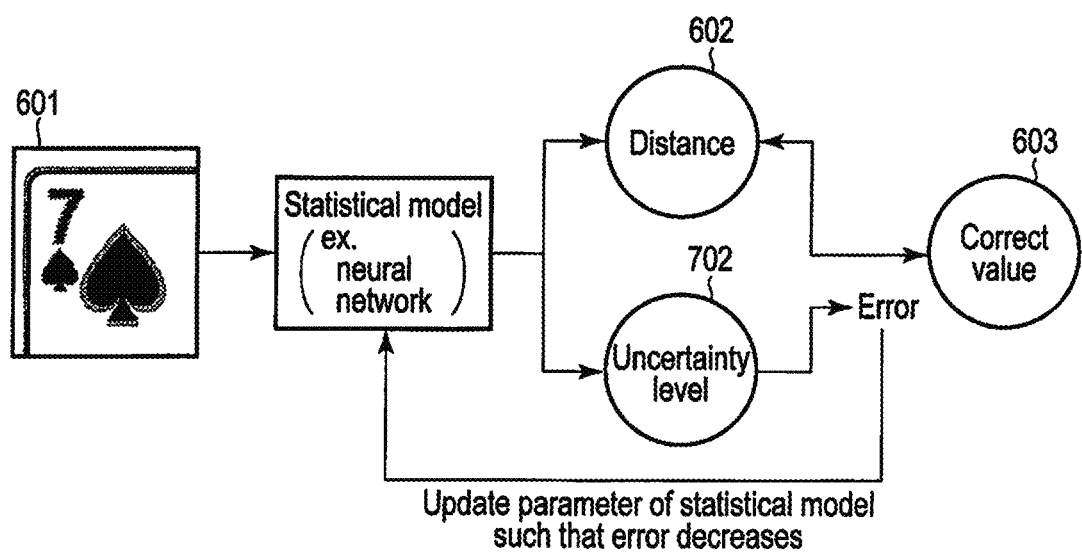
F I G. 25

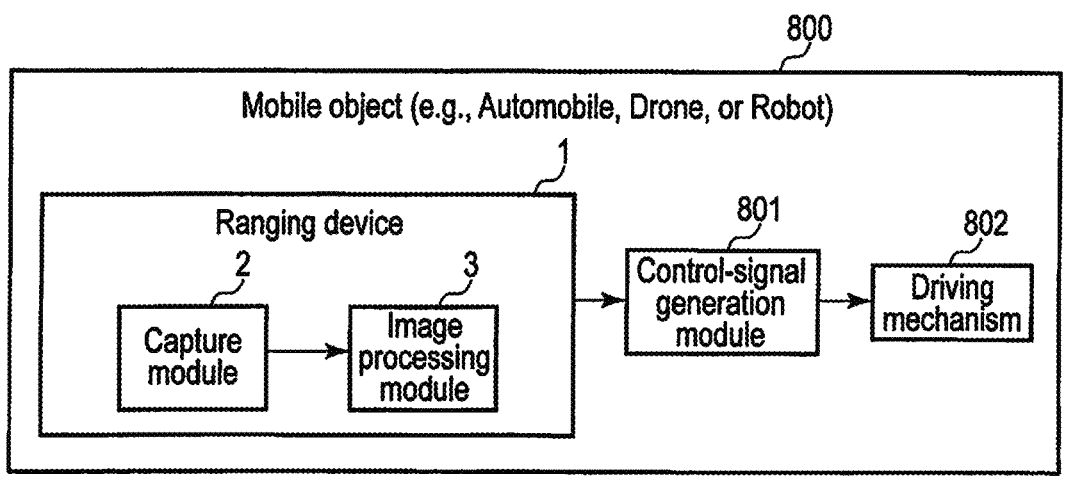
F I G. 27
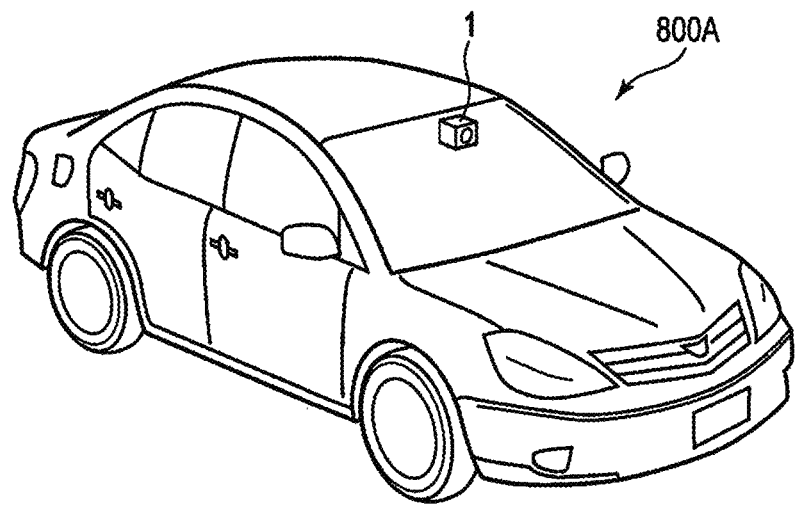
F I G. 28

IMAGE PROCESSING DEVICE, RANGING DEVICE, AND METHOD

CROSS-REFERENCE TO RELATED APPLICATIONS

This application is based upon and claims the benefit of priority from Japanese Patent Application No. 2019-166563, filed Sep. 12, 2019, the entire contents of which are incorporated herein by reference.

FIELD

Embodiments described herein relate generally to an image processing device, a ranging device, and a method.

BACKGROUND

For acquisition of the distance to a subject, in general, use of an image captured by two capture devices (cameras) or a stereo camera (compound-eye camera) has been known. In recent years, a technology of acquiring the distance to a subject with an image captured by one capture device (single-eye camera), has been disclosed.

However, in a case where a distance is acquired from an image captured by one capture device, the accuracy for the distance to be acquired needs to be improved.

BRIEF DESCRIPTION OF THE DRAWINGS

FIG. 2 illustrates an exemplary system configuration of the image processing device.

FIG. 3 explanatorily illustrates an outline of the operation of the ranging system.

FIG. 5 illustrates the relationship between the distance to a subject and bokeh that occurs in an image due to chromatic aberration in a case where an achromatic lens is used.

FIG. 6 illustrates the relationship between the size of the aperture of a diaphragm mechanism included in an optical system of a capture device and a PSF shape.

FIG. 13 explanatorily illustrates a first method of estimating distance from a captured image.

FIG. 14 illustrates exemplary information to be input into a statistical model in the first method.

FIG. 15 explanatorily illustrates a second method of estimating distance from a captured image.

FIG. 16 illustrates exemplary information to be input into a statistical model in the second method.

FIG. 20 is a flowchart of an exemplary procedure of processing of generating a statistical model.

FIG. 21 is a flowchart of an exemplary procedure of the image processing device when distance information is acquired from a captured image.

FIG. 22 is a flowchart of an exemplary procedure of distance acquisition processing.

FIG. 23 is a flowchart of an exemplary procedure of processing to be performed as a measure against a case where no distance information can be acquired.

FIG. 24 explanatorily illustrates an outline of a modification of the present embodiment.

FIG. 25 illustrates an exemplary learning method of a statistical model.

FIG. 27 illustrates an exemplary functional configuration of a mobile object including a ranging device.

FIG. 28 explanatorily illustrates the mobile object that is an automobile.

DETAILED DESCRIPTION

In general, according to one embodiment, an image processing device includes first storage and a processor. The first storage is configured to store a statistical model generated by learning of bokeh that occurs in a first image affected by aberration of a first optical system and varies non-linearly in accordance with a distance to a subject in the first image. The processor is configured to acquire a second image affected by aberration of a second optical system, input the acquired second image into the statistical model corresponding to a lens used in the second optical system and acquire distance information indicating a distance to a subject in the second image.

Various embodiments will be described hereinafter with reference to the accompanying drawings.

Figure 1:
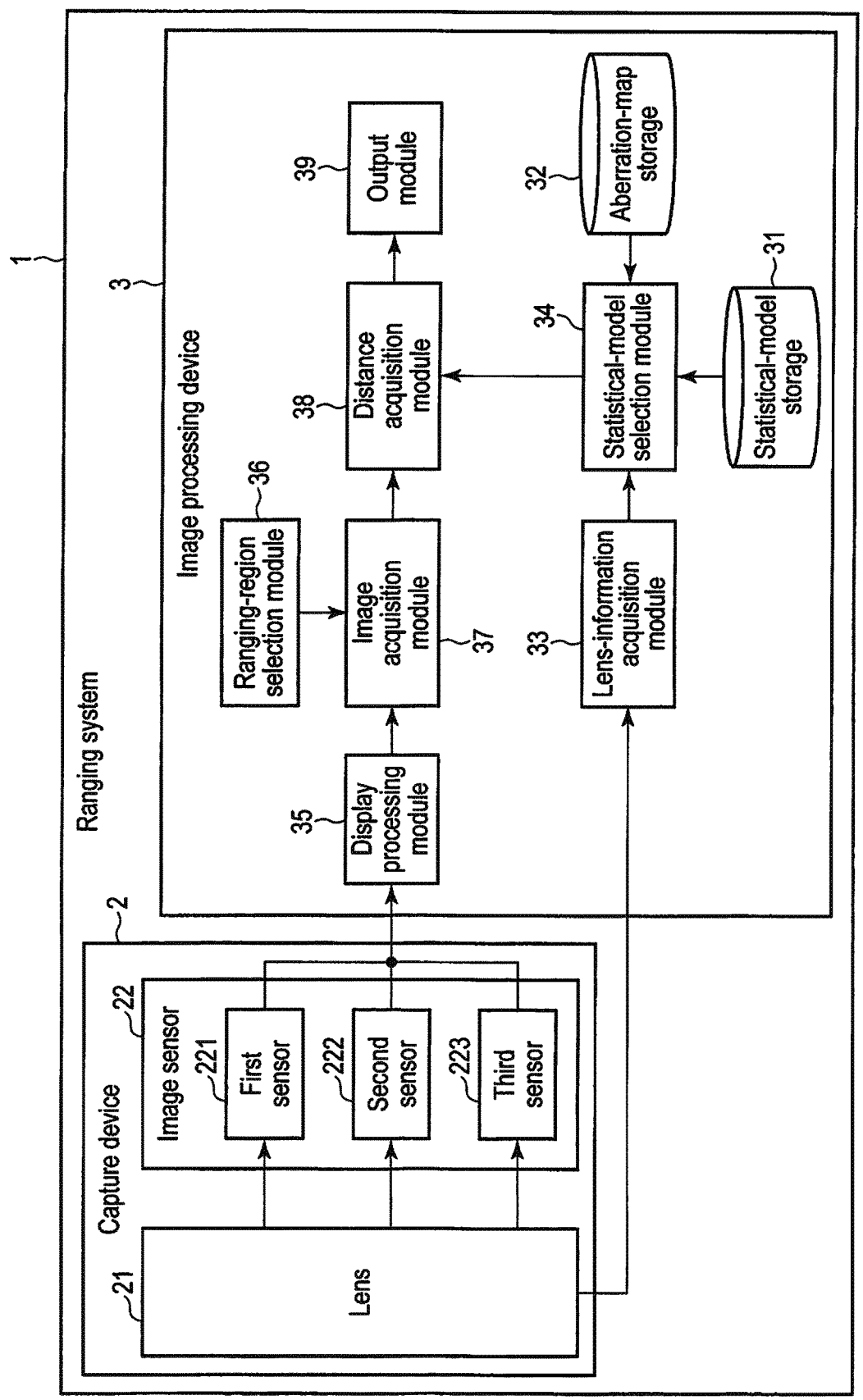
FIG. 1 illustrates an exemplary configuration of a ranging system including an image processing device according to an embodiment.

FIG. 1 illustrates an exemplary configuration of a ranging system including an image processing device according to the present embodiment. A ranging system 1 illustrated in FIG. 1 is used to capture an image and to acquire (measure) the distance from a point of capturing to a subject with the captured image.

As illustrated in FIG. 1, the ranging system 1 includes a capture device 2 and an image processing device 3. In the present embodiment, the ranging system 1 including the capture device 2 and the image processing device 3 that are separate devices, will be described. However, the ranging system 1 may be achieved as one device including the capture device 2 functioning as an image capturing module and an image processing device 2 functioning as the image processing module (hereinafter, referred to as a ranging device). For the ranging system 1, for example, a digital camera can be used as the capture device 2, and a personal computer, a smartphone, or a tablet computer can be used as the image processing device 3. Meanwhile, for the ranging device 1, for example, a digital camera, a smartphone, and a tablet computer can be used as the ranging device 1.

The capture device 2 is used to capture various images. The capture device 2 includes a lens 21 and an image sensor 22. The lens 21 and the image sensor 22 correspond to an optical system of the capture device 2 (single-eye camera). In the present embodiment, the lens 21 forms a lens unit, for example, together with a mechanism of adjusting the position of the lens 21 to control the focal point, a lens drive circuit, a diaphragm mechanism having an aperture for adjustment of the quantity of light (input light quantity) to be taken in the optical system of the capture device 2, a aperture control circuit, and a control circuit equipped with a memory (not illustrated) retaining, previously, information regarding the lens 21 (hereinafter, referred to as lens information).

In the present embodiment, the capture device 2 includes the lens 21 (lens unit) replaceable manually with another lens. A user can attach one of a plurality of types of lenses, such as a standard lens, a telephoto lens, and a wide-angle lens, to the capture device 2 for use. Note that replacement with a lens causes focal length and f-number (aperture value) to vary, so that an image can be captured in accordance with the lens used in the capture device 2.

In the present embodiment, the focal length means the distance from the lens to the position at which parallel light that has entered the lens converges. The f-number results from numerical conversion of the quantity of light to be taken in the capture device 2 in accordance with the diaphragm mechanism. Note that, as the f-number decreases in value, the quantity of light to be taken in the capture device 2 increases (namely, the aperture increases in size).

Light reflected on the subject enters the lens 21. The light having entered the lens 21 passes through the lens 21. The light having passed through the lens 21 reaches the image sensor 22, so that the image sensor 22 receives (detects) the light. The image sensor 22 converts the received light into an electric signal (photoelectric conversion) to generate an image of a plurality of pixels.

Note that, for example, the image sensor 22 is achieved by a charge coupled device (CCD) image sensor or a complementary metal oxide semiconductor (CMOS) image sensor. For example, the image sensor 22 includes a first sensor (R sensor) 221 that detects light in a red (R) wavelength band, a second sensor (G sensor) 222 that detects light in a green (G) wavelength band, and a third sensor (B sensor) 223 that detects light in a blue (B) wavelength band. The image sensor 22 receives light in the wavelength bands corresponding to the first to third sensors 221 to 223, so that respective sensor images (R image, G image, and B image) corresponding to the wavelength bands (color components) can be generated. That is, an image that the capture device 2 captures is a color image (RGB image), and the image includes the R image, the G image, and the B image.

Note that the image sensor 22 including the first to third sensors 221 to 223 will be described in the present embodiment. However, the image sensor 22 needs to include at least one of the first to third sensors 221 to 223. Further, the image sensor 22 may include a sensor for generation of a monochrome image, instead of including the first to third sensors 221 to 223.

In the present embodiment, the image generated based on the light having passed through the lens 21 has been affected by the aberration of the optical system (lens 21 included therein), and thus includes bokeh due to the aberration. Note that the bokeh that occurs in the image will be described in detail below.

The image processing device 3 includes, as a functional configuration, statistical-model storage 31, aberration-map storage 32, a lens-information acquisition module 33, a statistical-model selection module 34, a display processing module 35, a ranging-region selection module 36, an image acquisition module 37, a distance acquisition module 38, and an output module 39.

The statistical-model storage 31 stores a statistical model for use in acquisition of the distance to the subject from the image captured by the capture device 2. The statistical model stored in the statistical-model storage 31 is generated by learning of the bokeh that occurs in the image affected by the aberration of the optical system and varies non-linearly in accordance with the distance to the subject in the image. The statistical-model storage 31 stores a plurality of statistical models. However, the details will be described in detail below.

Note that such a statistical model can be generated by application of various known machine learning algorithms, such as a neural network and a random forest. Examples of the neural network applicable in the present embodiment may include a convolutional neural network (CNN), a fully connected neural network, and a recurrent neural network.

The aberration-map storage 32 stores information in map format indicating the distribution of the bokeh that occurs in the image affected by the aberration of the optical system and depends on the distance to the subject in the image and position in the image (hereinafter, referred to as an aberration map). In other words, the aberration map is information indicating the distance dependence and the positional dependence of the bokeh in the image due to the aberration (namely, the aberration of the optical system). Note that the aberration-map storage 32 stores the aberration map every statistical model stored in the statistical-model storage 31 (namely, the aberration map is linked with the statistical model).

The lens-information acquisition module 33 acquires the lens information regarding the lens 21 used in the optical system of the capture device 2. The lens information is retained in the memory of the lens unit as described above. Thus, the lens information is acquired from the lens unit. Note that the lens information includes the focal length, the f-number, and the focal point of the lens 21.

For example, based on the lens information acquired by the lens-information acquisition module 33, the statistical-model selection module 34 selects an appropriate statistical model from the plurality of statistical models stored in the statistical-model storage 31. Note that the statistical-model selection module 34 may use an aberration map stored in the aberration-map storage 32, to select the statistical model.

The display processing module 35 sequentially displays, as preview display, a plurality of images consecutively captured by the capture device 2.

The ranging-region selection module 36 selects a region in the image being displayed by the display processing module 35 (namely, the image captured by the capture device 2). Note that, in the present embodiment, the distance to the subject (information) included in the region selected by the ranging-region selection module 36 is acquired. The region that the ranging-region selection module 36 selects is determined based on, for example, an operation of the user.

That is, in the present embodiment, the preview display means that an image is displayed in advance so that the user verifies, for example, the subject that is a target for acquisition of distance.

In a case where a region in the image being displayed by the display processing module 35 is selected by the ranging-region selection module 36, the image acquisition module 37 acquires the image.

The distance acquisition module 38 acquires the distance information indicating the distance to the subject in the image acquired by the image acquisition module 37 (in the region selected by the ranging-region selection module 36). In this case, as described below, the distance acquisition module 38 inputs the image acquired by the image acquisition module 37, into the statistical model selected by the statistical-model selection module 34, to acquire the distance information.

The output module 39 outputs the distance information acquired by the distance acquisition module 38. Note that, for example, the distance information may be displayed through the display processing module 35 or may be output outside the image processing device 3.

FIG. 2 illustrates an exemplary system configuration of the image processing device 3 illustrated in FIG. 1. As illustrated in FIG. 2, the image processing device 3 includes a CPU 301, a nonvolatile memory 302, a RAM 303, a communication device 304, an input device 305, and a display device 306. The image processing device 3 has a bus 307 through which the CPU 301, the nonvolatile memory 302, the RAM 303, the communication device 304, the input device 305, and the display device 306 are mutually connected.

The CPU 301 is a processor that controls the respective operations of various components in the image processing device 3. The CPU 301 may be a single processor or may be formed of a plurality of processors. The CPU 301 executes various programs loaded from the nonvolatile memory 302 to the RAM 303. Examples of the programs include an operating system (OS) and various application programs. An example of the application programs is an image processing program 303A for acquisition, with the image captured by the capture device 2, of the distance from the capture device 2 to the subject in the image.

The nonvolatile memory 302 is a storage medium for use as an auxiliary storage. The RAM 303 is a storage medium for use as a main storage. Although the nonvolatile memory 302 and the RAM 303 are illustrated in FIG. 2, the image processing device 3 may include a different storage, such as a hard disk drive (HDD) or a solid state drive (SSD).

Note that, in the present embodiment, for example, the statistical-model storage 31 and the aberration-map storage 32 illustrated in FIG. 1 are achieved by the nonvolatile memory 302 or the different storage.

In the present embodiment, all or part of the lens-information acquisition module 33, the statistical-model selection module 34, the display processing module 35, the ranging-region selection module 36, the image acquisition module 37, the distance acquisition module 38, and the output module 39 illustrated in FIG. 1 is achieved by execution of the image processing program 303A by the CPU 301 (namely, the computer of the image processing device 3), namely, by software. The image processing program 303A may be stored in a computer-readable storage medium for distribution or may be downloaded to the image processing device 3 through a network. Note that all or part of the modules 33 to 39 may be achieved by hardware, such as an integrated circuit (IC) or may be achieved by a combination of software and hardware.

The communication device 304 performs wired communication or wireless communication. For example, the communication device 304 performs communication with external equipment through a network. An example of the external equipment is the capture device 2. In this case, the image processing device 3 receives the image from the capture device 2 through the communication device 304.

For example, the input device 305 includes a mouse or a keyboard. For example, the display device 306 includes a liquid crystal display (LCD). Note that the input device 305 and the display device 306 may be integrally formed like a touch-screen display.

Next, the operation of the ranging system 1 in the present embodiment will be described in outline with reference to FIG. 3.

In the ranging system 1, the capture device 2 (image sensor 22) generates an image affected by the aberration of the optical system (lens 21) as described above.

The image processing device 3 acquires the image generated by the capture device 2 and inputs the image into a statistical model stored in the statistical-model storage 31 (statistical model selected by the statistical-model selection module 34).

The image processing device 3 (distance acquisition module 38) acquires the distance information indicating the distance to the subject in the image output from the statistical model in which the image is input.

As above, in the present embodiment, use of the statistical model enables acquisition of the distance information from the image captured by the capture device 2.

Here, in the present embodiment, the image captured by the capture device 2 includes bokeh due to the aberration of the optical system (lens aberration) of the capture device 2 as described above.

The bokeh that occurs in the image captured by the capture device 2, will be described below. First, chromatic aberration related to the bokeh due to the aberration of the optical system of the capture device 2, will be described.

Figure 4:
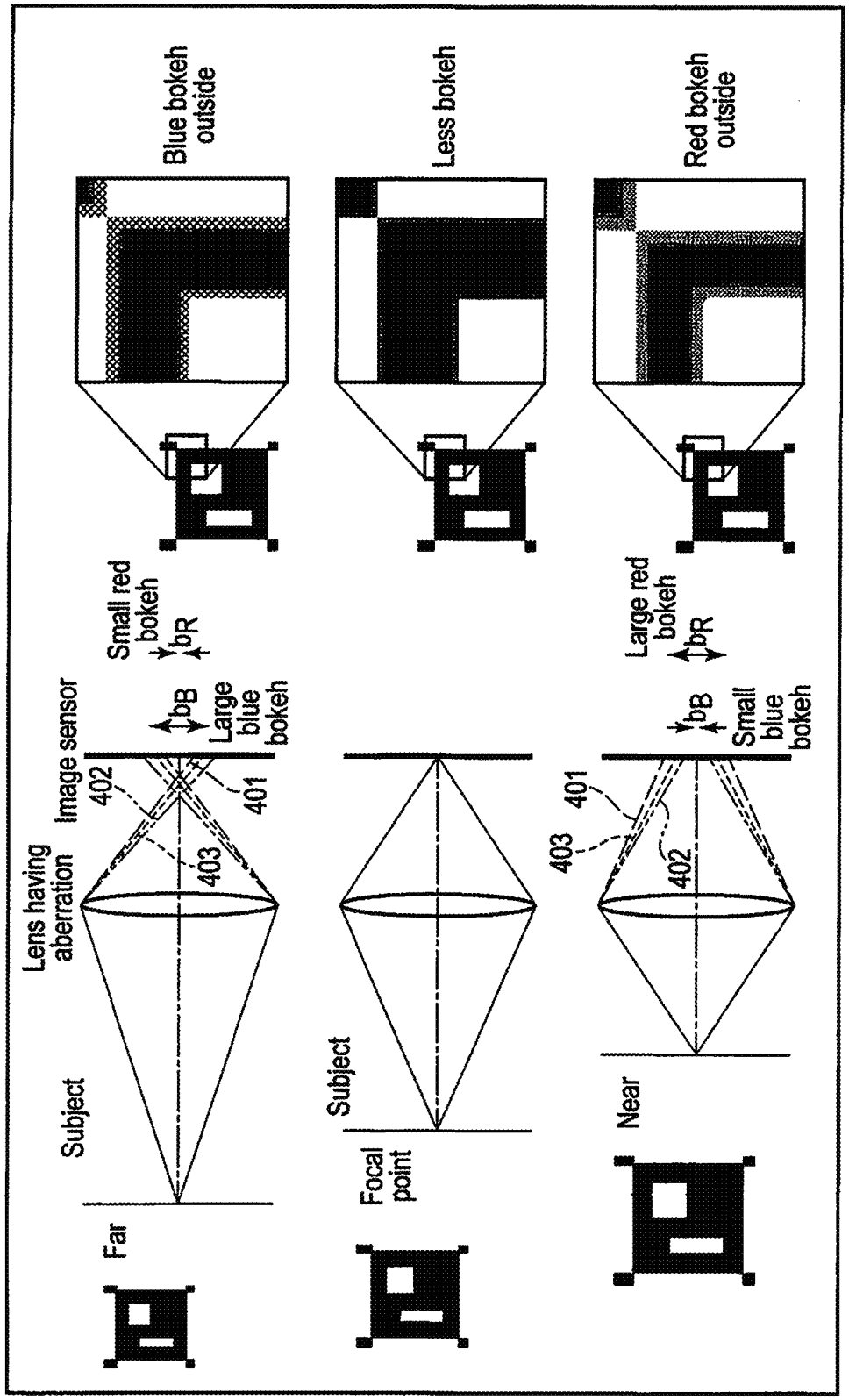
FIG. 4 illustrates the relationship between the distance to a subject and bokeh that occurs in an image due to chromatic aberration in a case where a single lens is used.

FIG. 4 illustrates the relationship between the distance to the subject and the bokeh that occurs in the image due to the chromatic aberration. In the following description, the in-focus position in the capture device 2 is referred to as the focal point.

The refractive index of the lens 21 having aberration varies every wavelength band of light to pass therethrough. Thus, for example, in a case where the position of the subject is shifted from the focal point, the respective rays of light in the wavelength bands do not converge to one point and thus reach different points. As a result, the chromatic aberration (bokeh) appears on the image.

FIG. 4 illustrates, on the upper side thereof, a case where the position of the subject is far from the capture device 2 (image sensor 22) with respect to the focal point (namely, the position of the subject is on the far side of the focal point).

In this case, regarding light 401 in the red wavelength band, the image sensor 22 (first sensor 221) generates an image including a relatively small bokeh bR. Meanwhile, regarding light 402 in the blue wavelength band, the image sensor 22 (third sensor 223) generates an image including a relatively large bokeh bB. Note that, regarding light 403 in the green wavelength band, an image including bokeh intermediate in size between the bokeh bR and the bokeh bB is generated. Therefore, in the image captured with the position of the subject far with respect to the focal point, a blue bokeh is observed outside the subject in the image.

Meanwhile, FIG. 4 illustrates, on the lower side thereof, a case where the position of the subject is near to the capture device 2 (image sensor 22) with respect to the focal point (namely, the position of the subject is on the near side of the focal point).

In this case, regarding the light 401 in the red wavelength band, the image sensor 22 (first sensor 221) generates an image including a relatively large bokeh bR. Meanwhile, regarding the light 402 in the blue wavelength band, the image sensor 22 (third sensor 223) generates an image including a relatively small bokeh bB. Note that, regarding the light 403 in the green wavelength band, an image including bokeh intermediate in size between the bokeh bR and the bokeh bB is generated. Therefore, in the image captured with the position of the subject near with respect to the focal point, a red bokeh is observed outside the subject in the image.

Here, FIG. 4 exemplifies the lens 21 that is a simple single lens. However, in general, for example, a lens subjected to chromatic aberration correction (hereinafter, referred to as an achromatic lens) is used in the capture device 2. Note that the achromatic lens is a combination of a low-dispersion convex lens and a high-dispersion concave lens and is smallest in the number of lenses among lenses for correction of chromatic aberration.

FIG. 5 illustrates the relationship between the distance to the subject and the bokeh that occurs in the image due to the chromatic aberration in a case where the achromatic lens is used as the lens 21. Although the achromatic lens is designed to have the focal point constant between blue wavelength and red wavelength, the chromatic aberration cannot be eliminated completely. Thus, in a case where the position of the subject is far with respect to the focal point, a green bokeh occurs as illustrated on the upper side of FIG. 5. In a case where the position of the subject is near with respect to the focal point, a purple bokeh occurs as illustrated on the lower side of FIG. 5.

Note that FIGS. 4 and 5 each illustrate, on the middle side thereof, a case where the position of the subject to the capture device 2 (image sensor 22) coincides with the focal point. In each case, the image sensor 22 (first to third sensors 221 to 223) generates an image having bokeh less in amount.

Here, because the diaphragm mechanism is provided in the optical system (lens module) of the capture device 2 as described above, the shape of the bokeh that occurs in the image captured by the capture device 2 varies due to the size of the aperture of the diaphragm mechanism. Note that the shape of the bokeh is referred to as a point spread function (PSF) shape, and indicates the diffusion distribution of light that occurs at the time of capturing of a point light source.

FIG. 6 illustrates, from left on the upper side thereof, the PSF shape that occurs in the central portion of the image captured by the capture device 2 including a lens having a focal length of 50 mm with the focal point and the f-number (aperture) that are 1500 mm and F1.8, respectively, in the capture device 2 (optical system), in order of the position of the subject closer to the capture device 2. FIG. 6 illustrates, from left on the lower side thereof, the PSF shape that occurs in the image captured by the capture device 2 including a lens having a focal length of 50 mm with the focal point and the f-number (aperture) that are 1500 mm and F4, respectively, in the capture device 2 (optical system), in order of the position of the subject closer to the capture device 2. Note that FIG. 6 illustrates, at the center on each of the upper side and the lower side thereof, the PSF shape in a case where the position of the subject coincides with the focal point.

The respective PSF shapes illustrated at the corresponding positions on the upper side and the lower side of FIG. 6 are identical in the position of subject to the capture device 2. However, even in a case where identification is satisfied in the position of subject, the PSF shape on the upper side (PSF shape that occurs in the image captured with the f-number be F1.8) and the PSF shape on the lower side (PSF shape that occurs in the image captured with the f-number be F4) are different in shape.

Furthermore, as indicated in the PSF shape on the leftmost side of FIG. 6 and the PSF shape on the rightmost side of FIG. 6, the PSF shapes in a case where the position of the subject is closer than the position of focus are different from those in a case where the position of the subject is farther than the position of focus even when, for example, the distance from the subject position to the focal position is approximately the same.

Figure 7:
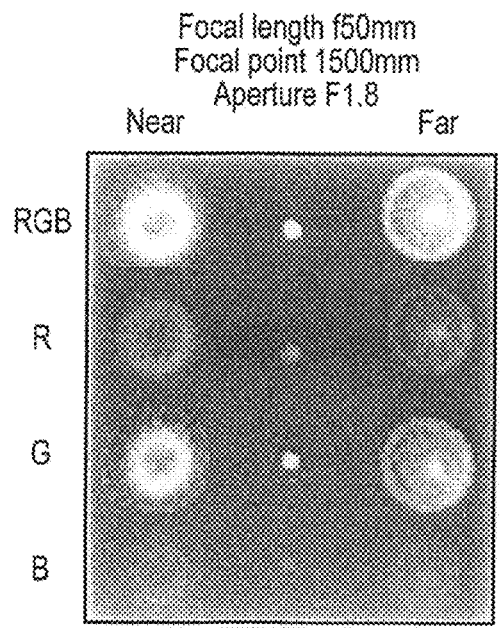
FIG. 7 illustrates an exemplary PSF shape that occurs in an image on each channel.
Figure 8:
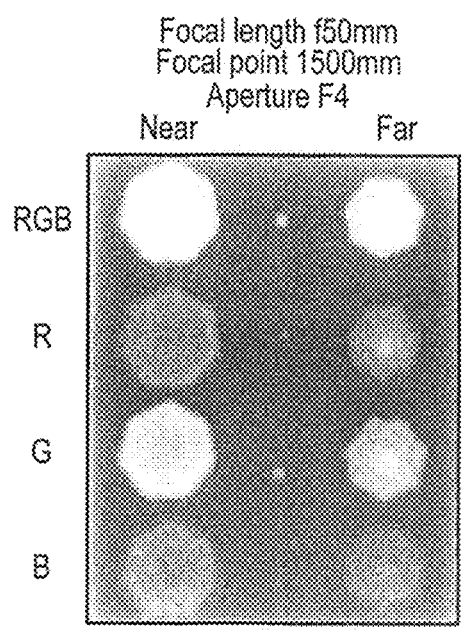
FIG. 8 illustrates another exemplary PSF shape that occurs in an image on each channel.

Note that the phenomenon in which the PSF shape varies in accordance with the size of the aperture of the diaphragm mechanism or the position of the subject to the capture device 2 as described above, occurs in each channel (RGB image, R image, G image, and B image), similarly. FIG. 7 separately illustrates a case where the position of the subject is near with respect to the focal point (near side) and a case where the position of the subject is far with respect to the focal point (far side), for the PSF shape that occurs in the image in each channel captured by the capture device 2. In FIG. 7, the capture device 2 includes a lens having a focal length of 50 mm with the focal point and the f-number that are 1500 mm and F1.8. FIG. 8 separately illustrates a case where the position of the subject is near with respect to the focal point and a case where the position of the subject is far with respect to the focal point, for the PSF shape that occurs in the image in each channel captured by the capture device 2. In FIG. 8, the capture device 2 includes a lens having a focal length of 50 mm with the focal point and the f-number that are 1500 mm and F4.

Furthermore, the PSF shape that occurs in the image captured by the capture device 2 varies depending on position in the image.

Figure 9:
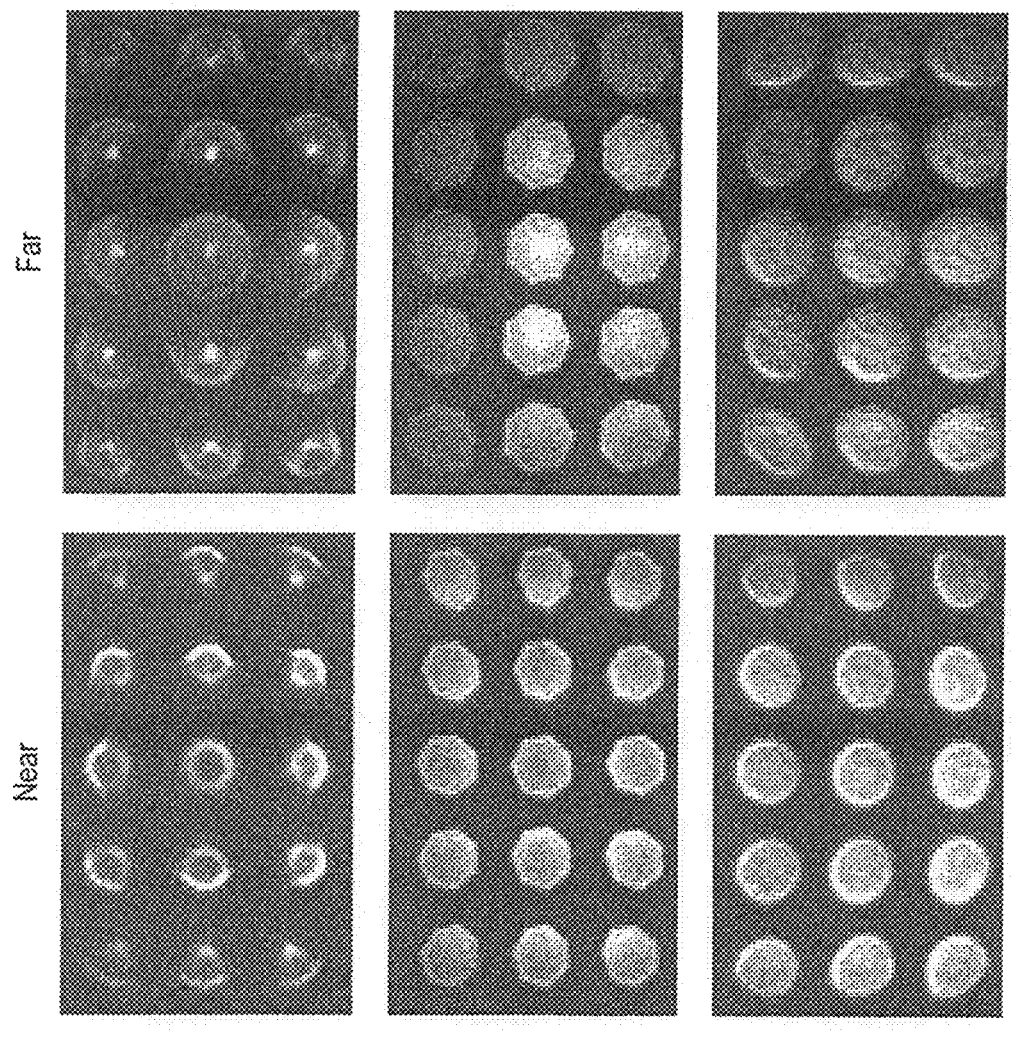
FIG. 9 illustrates an exemplary PSF shape that occurs at each position in an image.

FIG. 9 separately illustrates, on the upper side thereof, a case where the position of the subject is near with respect to the focal point and a case where the position of the subject is far with respect to the focal point, for the PSF shape that occurs at each position in the image captured by the capture device 2. In the upper side of FIG. 9, the capture device 2 includes a lens having a focal length of 50 mm with the focal point and the f-number that are 1500 mm and F1.8.

FIG. 9 separately illustrates, on the middle side thereof, a case where the position of the subject is near with respect to the focal point and a case where the position of the subject is far with respect to the focal point, for the PSF shape that occurs at each position in the image captured by the capture device 2. In the middle side of FIG. 9, the capture device 2 includes a lens having a focal length of 50 mm with the focal point and the f-number that are 1500 mm and F4.

As illustrated on the upper side and the middle side of FIG. 9, for example, near the end portion of the image captured by the capture device 2 (in particular, near the upper-left corner portion), a PSF shape different from the PSF shape located near the center of the image can be observed.

FIG. 9 separately illustrates, on the lower side thereof, a case where the position of the subject is near with respect to the focal point and a case where the position of the subject is far with respect to the focal point, for the PSF shape that occurs at each position in the image captured by the capture device 2. In the lower side of FIG. 9, the capture device 2 includes a lens having a focal length of 105 mm with the focal point and the f-number that are 1500 mm and F4.

FIG. 9 illustrates, on the upper side and the middle side thereof, the PSF shape that occurs in the image captured with the same lens. As illustrated on the lower side of FIG. 9, in the case of use of the lens different in focal length, the PSF shape varied in accordance with the lens is observed (PSF shape different from those on the upper side and the middle side of FIG. 9).

Figure 10:
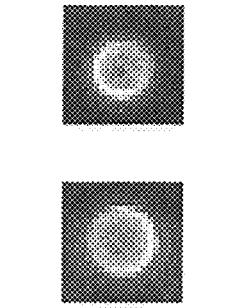
FIG. 10 specifically explanatorily illustrates the positional dependence of the PSF shape corresponding to each type of lens.

Next, the positional dependence of the PSF shape corresponding to each type of lens (aberration of each lens) for use in the optical system of the capture device 2, will be specifically described with reference to FIG. 10. FIG. 10 illustrates the PSF shapes that occurs near the center of the image (screen center) and near the end portion of the image (screen end) captured with each of a plurality of lenses different in focal length. In FIG. 10, the PSF shapes are separately illustrated in a case where the position of the subject is near with respect to the focal point and in a case where the position of the subject is far with respect to the focal point.

As illustrated in FIG. 10, the PSF shape that occurs near the center of the image is approximately circular and constant even in a case where types of lenses are different from each other. However, the PSF shape that occurs near the end portion of the image is different in shape from the PSF shape that occurs near the center of the image and varies in characteristic (feature) in accordance with each type of lens. Note that the point that the purple bokeh occurs near the edge of the PSF in a case where the position of the subject is near with respect to the focal point and the green bokeh occurs near the edge of the PSF in a case where the position of the subject is far with respect to the focal point, described in FIG. 5, is satisfied even in a case where types of lenses are different from each other.

FIG. 10 illustrates two examples regarding a lens having a focal length of 50 mm (#1 and #2). The examples are identical in a focal length of 50 mm but are different in lens manufacturer (namely, different in product). The same applies to a lens having a focal length of 85 mm.

Here, in the present embodiment, the distance information is acquired with the statistical model generated by learning of the bokeh that occurs in the image. However, because the PSF shape near the end portion of the image in particular varies greatly depending on each type of lens as described above, the accuracy for the distance to be acquired from the image is likely to deteriorate in a case where the distance information is acquired with one statistical model generated without consideration of each type of lens.

Thus, in the present embodiment, the distance to the subject is acquired from the image captured by the capture device 2 by focusing on the bokeh that varies non-linearly in accordance with the distance to the subject in the image (namely, the position of the subject to the capture device 2) and using the statistical model generated every lens for use in the optical system of capture device 2.

In the present embodiment, examples of the bokeh that varies non-linearly in accordance with the distance to the subject include the bokeh that occurs due to the chromatic aberration of the optical system of the capture device 2 described in FIGS. 4 and 5. Also, the examples of the bokeh include the bokeh that occurs in accordance with the size of the aperture (namely, the f-number) of the diaphragm mechanism that adjusts the quantity of light to be taken in the optical system of the capture device 2 described in FIGS. 6 to 8. Furthermore, the examples of the bokeh include the bokeh that varies in accordance with position in the image captured by the capture device 2 described in FIGS. 9 and 10.

Figure 11:
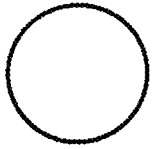
FIG. 11 illustrates the relationship between the nonlinearity of the PSF shape and the shape of the aperture of the diaphragm mechanism.

Note that the PSF shape varies depending on the shape of the aperture of the diaphragm mechanism. Here, FIG. 11 illustrates the relationship between the nonlinearity (asymmetry) of the PSF shape and the shape of the aperture of the diaphragm mechanism. The nonlinearity of the PSF shape occurs easily in a case where the shape of the aperture of the diaphragm mechanism is not circular. In particular, the nonlinearity of the PSF shape occurs easily in a case where the shape of the aperture is odd-gonal or in a case where an even-gon is arranged asymmetrically to the horizontal or vertical axis of the image sensor 22.

In FIG. 9, each image indicates the PSF shape depending on the distance to the subject in the image and position in the image (namely, the bokeh having the distance dependence and the positional dependence). Each image corresponds to an aberration map stored in the aberration-map storage 32. That is, in the present embodiment, the aberration-map storage 32 stores a plurality of aberration maps corresponding to the focal length and the f-number of a lens (namely, the type of lens and the lens information). Note that each of the aberration maps stored in the aberration-map storage 32 is linked with the statistical model corresponding to the lens that causes the bokeh having the distance dependence and the positional dependence indicated by the aberration map (namely, the statistical model having learned the bokeh having the distance dependence and the positional dependence).

Figure 12:
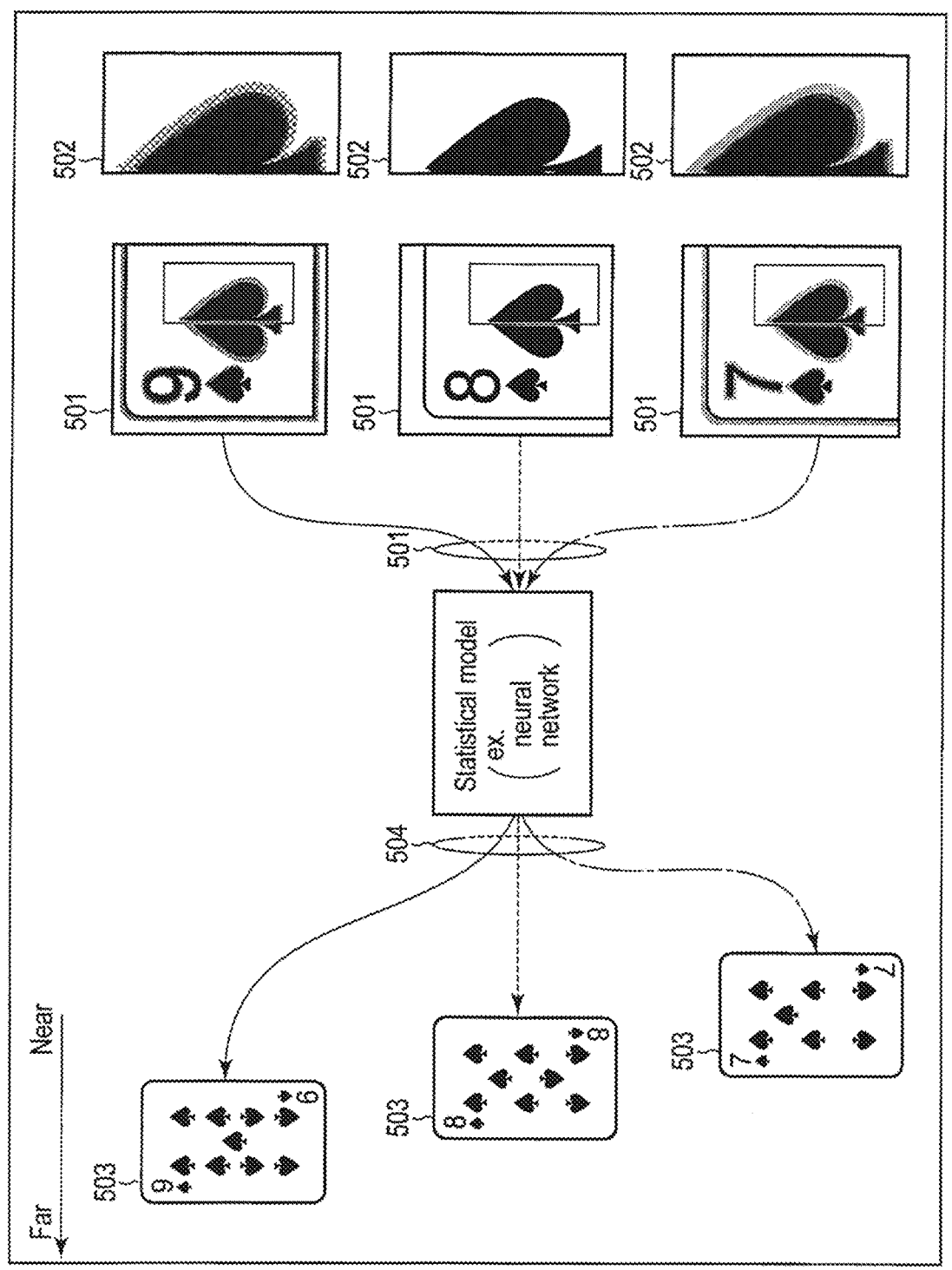
FIG. 12 illustrates an outline of an operation of acquiring distance information.

FIG. 12 illustrates an outline of an operation of acquiring the distance information in the present embodiment. In the following description, the image captured by the capture device 2 for acquisition of the distance information (distance to the subject) is referred to as a captured image.

Bokeh (bokeh information) 502 that occurs in a captured image 501 illustrated in FIG. 12 is a physical clue regarding the distance to a subject 503. Specifically, the color of the bokeh and the size and shape of the PSF are clues regarding the distance to the subject 503.

In the image processing device 3 (distance acquisition module 38) according to the present embodiment, the bokeh 502 that occurs in the captured image 501, which is a physical clue, is analyzed by the statistical model, resulting in estimation of a distance 504 to the subject 503.

An exemplary method of estimating the distance from the captured image by the statistical model in the present embodiment, will be described below. Herein, first, second, and third methods will be described.

First, the first method will be described with reference to FIG. 13. In the first method, the distance acquisition module 38 extracts a local region (image patch) 501a from the captured image 501.

In this case, for example, the entire region of the captured image 501 may be divided in a matrix and then each divided partial region may be sequentially extracted as the local region 501a. The local region 501a may be extracted by recognition of the captured image 501 such that the region in which the subject (image) is detected is covered. The local region 501a may partially overlap another local region 501a.

Every extracted local region 501a, the distance acquisition module 38 inputs information regarding the local region 501a (information regarding the captured image 501) into the statistical model, to estimate the distance 504 to the subject in the local region 501a.

The statistical model in which the information regarding the local region 501a is input as above, estimates the distance every pixel of the local region 501a.

Here, for example, in a case where a specific pixel belongs to both of a first local region 501a and a second local region 501a (namely, the pixel is included in the region in which the first local region 501a and the second local region 501a overlap), the distance estimated with the pixel belonging to the first local region 501a and the distance estimated with the pixel belonging to the second local region 501a do not necessarily coincide with each other.

Thus, for example, as described above, in a case where a plurality of local regions 501a partially overlapping has been extracted, the distance based on a pixel in the region in which the plurality of local regions 501a overlaps, may be the average value of, for example, the distance estimated based on the overlapped partial region (pixel) of one local region 501a and the distance estimated based on the overlapped partial region (pixel) of the other local region 501a. In a case where three or more local regions 501a partially overlapping are extracted, the distance based on a pixel in the region in which the three or more local regions 501a overlap, may be determined by majority voting with the respective distances estimated based on the overlapped partial regions of the three or more local regions 501a.

FIG. 14 illustrates exemplary information regarding the local region 501a to be input into the statistical model in the first method.

For each of the R image, the G image, and the B image included in the captured image 501, the distance acquisition module 38 generates gradient data of the local region 501a extracted from the captured image 501 (gradient data of the R image, gradient data of the G image, and gradient data of the B image). The gradient data generated by the distance acquisition module 38 as above is input into the statistical model.

Note that the gradient data indicates the difference in pixel value (difference value) between each pixel and a pixel adjacent thereto. For example, in a case where the local region 501a is extracted as a rectangular region of n pixels (X-axis direction)×m pixels (Y-axis direction), the gradient data is generated in which the difference value calculated between each pixel in the local region 501a and, for example, the right adjacent pixel thereto is arranged in a matrix of n rows×m columns.

With the gradient data of the R image, the gradient data of the G image, and the gradient data of the B image, the statistical model estimates the distance from the bokeh occurring in each image. FIG. 14 illustrates a case where the gradient data of each of the R image, the G image, and the B image is input into the statistical model. However, the gradient data of the captured image 501 (RGB image) may be input into the statistical model.

Next, the second method will be described with reference to FIG. 15. In the second method, as the information regarding the local region 501a in the first method, the gradient data of each local region (image patch) 501a and positional information regarding the local region 501a in the captured image 501 are input into the statistical model.

For example, the positional information 501b may indicate the central point of the local region 501a or may indicate a predetermined side, such as an upper-left side. As the positional information 501b, positional information on the captured image 501 regarding each pixel of the local region (image patch) 501a may be used.

Additional input of the positional information 501b into the statistical model as described above, enables estimation of the distance in consideration of the difference between the bokeh of a subject image formed by light passing through the central portion of the lens 21 and the bokeh of a subject image formed by light passing through the end portion of the lens 21.

That is, according to the second method, the distance can be more reliably estimated from the captured image 501, based on the correlation between the bokeh, the distance, and the position on the image.

FIG. 16 illustrates exemplary information regarding the local region 501a to be input into the statistical model in the second method.

For example, in a case where a rectangular region of n pixels (X-axis direction)×m pixels (Y-axis direction) is extracted as the local region 501a, the distance acquisition module 38 acquires the X-coordinate value (X-coordinate data) on the captured image 501 corresponding to, for example, the central point of the local region 501a and the Y-coordinate value (Y-coordinate data) on the captured image 501 corresponding to, for example, the central point of the local region 501a.

In the second method, the X-coordinate data and the Y-coordinate data acquired by the distance acquisition module 38 as above are input into the statistical model, together with the pieces of gradient data of the R image, the G image, and the B image.

Figure 17:
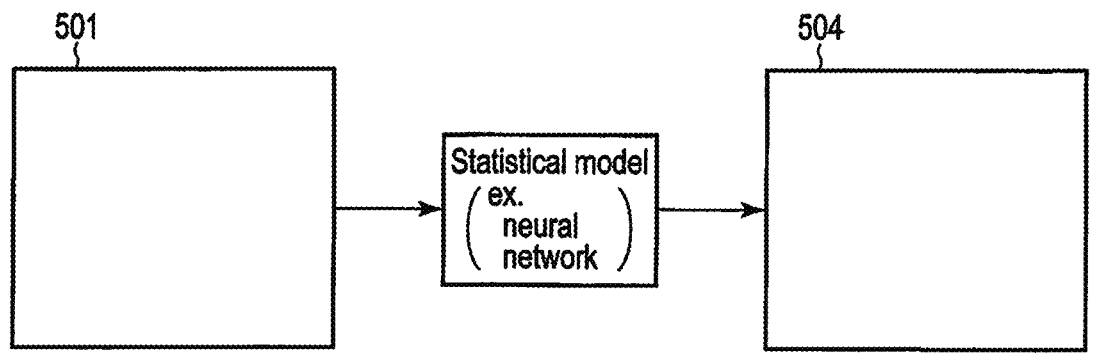
FIG. 17 explanatorily illustrates a third method of estimating distance from a captured image.

Furthermore, the third method will be described with reference to FIG. 17. In the third method, no local region (image patch) 501a is extracted from the captured image 501, unlike the first method and the second method. In the third method, the distance acquisition module 38 inputs information regarding the entire region of the captured image 501 (pieces of gradient data of the R image, the G image, and the B image) into the statistical model.

In comparison with the first method and the second method in which the distance 504 is estimated every local region 501a, the third method is likely to increase the uncertainty of estimation of the statistical model but enables reduction of the load of the distance acquisition module 38.

In the following description, for convenience, the information to be input into the statistical model in each of the first, second, and third methods is referred to as information regarding the image.

Figure 18:
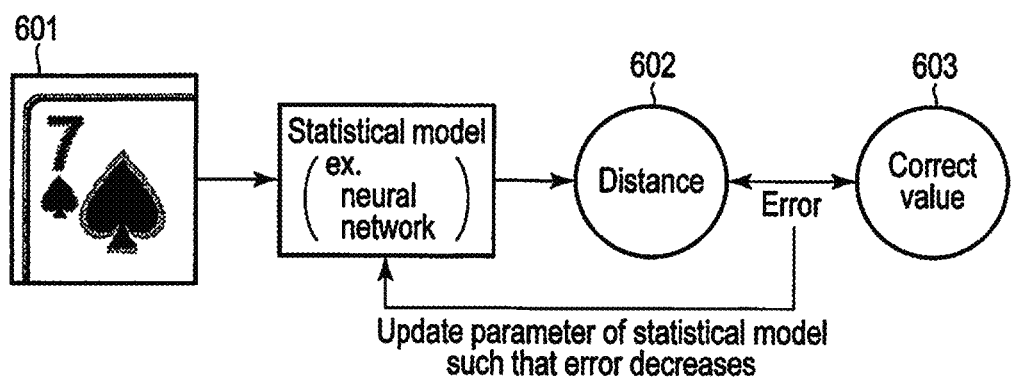
FIG. 18 illustrates an exemplary learning method of a statistical model.

FIG. 18 illustrates an exemplary learning method of the statistical model in the present embodiment. Herein, the learning of the statistical model with the image captured by the capture device 2 will be described. However, for example, the learning of the statistical model may be carried out with an image captured by a different device (e.g., a camera) having an optical system similar to the optical system of the capture device 2.

Note that the image captured by the capture device 2 for acquisition of the distance information is referred to as the captured image in the above description. Meanwhile, in the present embodiment, an image with which the statistical model learns the bokeh that varies non-linearly in accordance with the distance, is referred to as an image for learning, for convenience.

Even in a case where any method is used from the first method described with reference to FIG. 13, the second method described with reference to FIG. 15, and the third method described with reference to FIG. 17, the learning of the statistical model is carried out basically as follows. Information regarding an image for learning 601 is input into the statistical model, and then the error between a distance (distance information) 602 estimated by the statistical model and a correct value 603 is fed back to the statistical model. Note that the feedback means that a parameter of the statistical model (e.g., a weight coefficient) is updated such that the error is reduced.

In a case where the first method is applied as the method of estimating the distance from the captured image, even at the time of learning of the statistical model, every local region (image patch) extracted from the image for learning 601, the information regarding the local region (gradient data) is input into the statistical model. According to this, the distance 602 is estimated based on each pixel in each local region by the statistical model. The error acquired by comparison between the distance 602 estimated as above and the correct value 603, is fed back to the statistical model.

Similarly, in a case where the second method is applied as the method of estimating the distance from the captured image, even at the time of learning of the statistical model, every local region (image patch) extracted from the image for learning 601, the gradient data and the positional information as the information regarding the local region are input into the statistical model. According to this, the distance 602 is estimated based on each pixel in each local region by the statistical model. The error acquired by comparison between the distance 602 estimated as above and the correct value 603, is fed back to the statistical model.

In a case where the third method is applied as the method of estimating the distance from the captured image, even at the time of learning of the statistical model, the information regarding the entire region of the image for learning 601 (gradient data) is collectively input into the statistical model. According to this, the distance 602 is estimated based on each pixel in the image for learning 601 by the statistical model. The error acquired by comparison between the distance 602 estimated as above and the correct value 603, is fed back to the statistical model.

For example, the statistical model in the present embodiment is generated by repeatedly carrying out learning with the image captured while the distance from the capture device 2 to the subject is varied with the focal point fixed. In a case where learning has been completed for one focal point, learning is carried out similarly for another focal point, so that a higher-accuracy statistical model can be generated.

Here, the distance to the subject to be estimated from the image (captured image or image for learning) will be specifically described with reference to FIG. 19.

Figure 19:
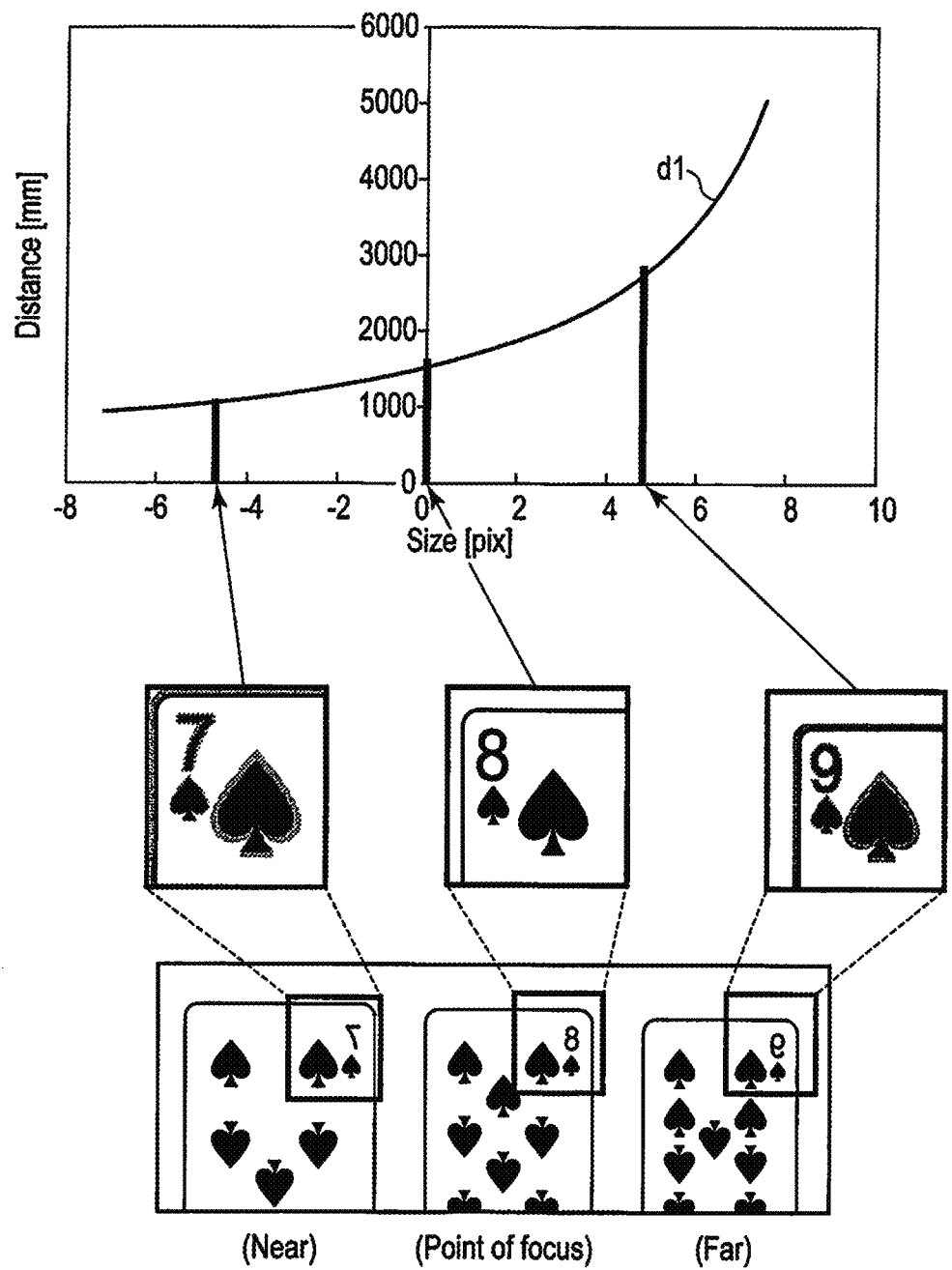
FIG. 19 specifically explanatorily illustrates the distance to a subject, to be estimated from an image.

In FIG. 19, the size of the bokeh that occurs in a case where the subject is near with respect to the focal point (near side) is indicated negatively in value on the X axis. Also, in FIG. 19, the size of the bokeh that occurs in a case where the subject is far with respect to the focal point (far side) is indicated positively in value on the X axis. That is, in FIG. 19, the color and size of the bokeh are indicated positively and negatively in value.

FIG. 19 illustrates that the absolute value of the size (pixel) of the bokeh increases as the subject moves away from the focal point in both of the case where the position of the subject is near with respect to the focal point and the case where the position of the subject is far with respect to the focal point.

The example illustrated in FIG. 19 assumes that the focal point is approximately 1500 mm in the optical system in which the image is captured. In this case, for example, the bokeh that is approximately −4.8 pixels in size corresponds to a distance of approximately 1000 mm from the optical system. The bokeh that is 0 pixels in size corresponds to a distance of 1500 mm from the optical system. The bokeh that is approximately 4.8 pixels in size corresponds to a distance of approximately 2750 mm from the optical system.

Herein, for convenience, the case where the size (pixel) of the bokeh is indicated on the X axis has been described. As described in FIGS. 6 to 10, the shape of the bokeh (PSF shape) that occurs in the image varies between the case where the subject is near with respect to the focal point and the case where the subject is far with respect to the focal point, and varies depending on position in the image. Thus, the value indicated on the X axis in FIG. 19 has in practice taken the shape of the bokeh (PSF shape) into account.

Note that, in a case where the information regarding the image for learning is input into the statistical model at the time of learning of the statistical model, the value indicating the color, size, and shape of the bokeh positively or negatively (hereinafter, referred to as a bokeh value), corresponding to the actual distance to the subject at the time of capturing of the image for learning, is used as the correct value. The statistical model in which such learning is carried out, outputs the bokeh value as the distance to the subject in the image.

For example, as indicated with a curved line dl of FIG. 19, because the distance to the subject is in correlation with the color, size, and shape of the bokeh, estimation of the distance and estimation of the color, size, and shape of the bokeh are synonymous.

Note that, in comparison with direct estimation of the distance by the statistical model, estimation of the color, size, and shape of the bokeh by the statistical model enables improvement of the accuracy of estimation of the statistical model. In this case, for example, in a case where, every local region of n pixels (X-axis direction)×m pixels (Y-axis direction), the information regarding the local region is input into the statistical model, the statistical model outputs the distance in which the bokeh value indicating the color, size, and shape of the bokeh estimated based on each pixel of the local region is arranged in a matrix of n rows×m columns.

For the learning of the statistical model, the image for learning including the subject captured at each distance with as small granularity as possible from the lower limit (near side) to the upper limit (far side) of distance acquirable (estimable) in the image processing device 3, is prepared. The information regarding the prepared image for learning is input into the statistical model. As the correct value for use in the learning of the statistical model, the bokeh value indicating the color, size, and shape of the bokeh corresponding to the distance to the subject at the time of capturing of the image for learning as above, is used. Note that, for the learning of the statistical model, preferably, various images for learning different in subject are prepared.

Next, an exemplary procedure of processing of generating the statistical model for use in the image processing device 3 according to the present embodiment, will be described with reference to a flowchart illustrated in FIG. 20. Note that, for example, the processing illustrated in FIG. 20 may be performed in the image processing device 3 or may be performed in a different device.

First, the information regarding an image for learning previously prepared is input into the statistical model (step S1). For example, the image for learning is an image generated by the image sensor 22, based on the light having passed through the lens 21 included in the capture device 2, the image being affected by the aberration of the optical system (lens 21) of the capture device 2. Specifically, the image for learning includes the bokeh that varies non-linearly in accordance with the distance to the subject, described in FIGS. 4 to 10.

Note that the image processing device 3 or the different device that performs the processing illustrated in FIG. 20 grasps the information regarding the optical system (e.g., the focal length, the f-number, and the focal point) in which the image for learning is captured, in correlation with the bokeh that occurs in the image for learning.

In a case where the first method is applied as the method of estimating the distance from the captured image, as the information regarding the image for learning, every local region of the image for learning, the pieces of gradient data of the R image, the G image, and the B image are input into the statistical model.

In a case where the second method is applied as the method of estimating the distance from the captured image, as the information regarding the image for learning, every local region of the image for learning, the pieces of gradient data of the R image, the G image, and the B image together with the positional information regarding the local region on the image for learning are input into the statistical model.

In a case where the third method is applied as the method of estimating the distance from the captured image, as the information regarding the image for learning, the pieces of gradient data of the R image, the G image, and the B image for the entire region of the image for learning are input into the statistical model.

Note that, in the present embodiment, the description in which the pieces of gradient data of the R image, the G image, and the B image are input into the statistical model, is given. However, in a case where the distance is estimated from the viewpoint of the shape of the bokeh (PSF shape) that occurs in the image for learning, at least one piece of gradient data of the pieces of gradient data of the R image, the G image, and the B image, needs to be input into the statistical model. Meanwhile, in a case where the distance is estimated from the viewpoint of the color and size of the bokeh that occurs in the image for learning due to the chromatic aberration, at least two pieces of gradient data of the pieces of gradient data of the R image, the G image, and the B image, need to be input into the statistical model.

After the information regarding the image for learning is input into the statistical model, the distance to the subject is estimated by the statistical model (step S2). In this case, the bokeh occurring in the image for learning is extracted from the image for learning by the statistical model, so that the distance corresponding to the bokeh is estimated.

The distance estimated at step S2 is compared with the correct value acquired at the time of capturing of the image for learning (step S3).

A result of the comparison (error) at step S3 is fed back to the statistical model (step S4). Thus, a parameter in the statistical model is updated such that the error is reduced (namely, learning of the bokeh occurring in the image for learning is carried out).

The processing illustrated in FIG. 20 is repeatedly performed every image for learning, resulting in generation of the statistical model having learned the bokeh that varies non-linearly in accordance with the distance to the subject in the image for learning (the distance dependence and the positional dependence). The statistical model generated as above is stored in the statistical-model storage 31 included in the image processing device 3.

The learning of one statistical model has been described herein. In the present embodiment, the statistical model is prepared every lens for use in the optical system of the capture device 2 as described above. Here, for example, in a case where a first lens and a second lens can be used in the capture device 2, the statistical model corresponding to the first lens is generated by repetition of learning with an image (image for learning) captured by the capture device 2 with the first lens. Meanwhile, the statistical model corresponding to the second lens is generated by repetition of learning with an image (image for learning) captured by the capture device 2 with the second lens. The same applies to other lenses. That is, in the present embodiment, repetition of learning with replacement of lenses for use in the optical system of the capture device 2 enables generation of the statistical model corresponding to each of the lenses.

Note that the case where the images captured with replacement of the plurality of lenses are used as the image for learning, has been described herein. In the present embodiment, the aberration-map storage 32 stores the plurality of aberration maps indicating the distance dependence and the positional dependence corresponding to the focal length, the f-number, and the focal point of each lens. The plurality of aberration maps indicates the distribution of the bokeh that occurs in the image captured with each of the plurality of lenses. Thus, an image (color image) obtained by convolution of an aberration map to a predetermined image is used as the image for learning, and use of the image enables the learning of the statistical model corresponding to each lens. Such a configuration enables reduction of the labor for collection of the image for learning.

Next, an exemplary procedure of the image processing device 3 when the distance information is acquired from the captured image, will be described with reference to a flowchart illustrated in FIG. 21. Note that, in the following description, the lens 21 used in the optical system of the capture device 2 that captures an image to be captured (namely, the lens 21 attached to the capture device 2), is referred to as a target lens 21.

First, the capture device 2 (image sensor 22) consecutively captures the subject, to generate a plurality of captured images including the subject. Note that, in a case where the focal point of the capture device 2 is fixed, the light having passed through the target lens 21, has the responsive shape of a point spread function (PSF) or a point image distribution function varying in accordance with the distance to the subject. The image sensor 22 detects such light, resulting in generation of a captured image affected by the aberration of the optical system (target lens 21) of the capture device 2.

The display processing module 35 sequentially displays the plurality of captured images generated in the capture device 2 as above, onto, for example, the display device to perform the preview display (step S11).

Next, the ranging-region selection module 36 selects a region (position) for acquisition of the distance information in the captured image being subjected to the preview display (step S12).

Note that, for example, the processing at step S12 is performed in accordance with an operation of the user to the image processing device 3. Specifically, for example, the ranging-region selection module 36 can select a region in the captured image (hereinafter, referred to as a ranging region) selected in accordance with an operation of the user to the input device (e.g., the mouse, the keyboard, or the touch-screen display) included in the image processing device 3.

For the ranging device 1, such as a digital camera, the ranging region may be selected in accordance with an operation of the user to a physical button (e.g., a menu button or a shutter button) provided to the ranging device 1. Also, the ranging region may be selected in accordance with an operation of the user to the touch-screen display (preview display) provided to the ranging device 1.

Furthermore, in a case where the ranging device 1 (digital camera) has an autofocus (AF) function of bringing a specific subject in focus, a region including the subject extracted by the autofocus function, may be automatically selected as the ranging region. Note that the ranging region may be selected in accordance with, for example, other image processing performed on the captured image.

The number of ranging regions to be selected at step S12 may be one or at least two. The ranging region may be a partial region of the captured image or may be the entire region of the captured image. In a case where the ranging region is a partial region of the captured image, for example, the shape of the ranging region may be rectangular or circular.

After performance of the processing at step S12, the ranging-region selection module 36 acquires, as information regarding the selected ranging region, the number of ranging regions and the position of the ranging region. Note that, for example, the position of the ranging region may be indicated with the X-coordinate value and the Y-coordinate value on the captured image corresponding to the central point of the ranging region.

Next, the image acquisition module 37 acquires the captured image from which the ranging region is selected at step S12 (step S13).

After performance of the processing at step S13, distance acquisition processing is performed, based on the information regarding the ranging region (selected area) selected at step S12 and the captured image acquired at step S13 (step S14). Note that, in the distance acquisition processing, the distance information indicating the distance to the subject in the ranging region is acquired.

After performance of the processing at step S14, the output module 39 outputs the distance information acquired in the processing at step S14 (step S15). In this case, the output module 39 can output the distance information as image data in map format arranged in positionally association with the ranging region in the captured image acquired at step S13 (image data of pixels each having the distance indicated from the distance information as a pixel value). Note that the distance information may be output simply as a numerical value or may be output in other format.

Next, an exemplary procedure of the distance acquisition processing (processing at step S14 illustrated in FIG. 21) will be described with reference to a flowchart illustrated in FIG. 22.

Here, as described above, the lens information regarding the target lens 21 is previously retained in the memory included in the lens unit. The lens information corresponds to the specification values (catalog values) of the target lens 21, and includes, for example, the focal length and the f-number of the target lens 21. The lens information may include, for example, the current focal point.

In the distance acquisition processing, the lens-information acquisition module 33 acquires the lens information from the lens module (step S21).

Here, for example, the image processing device 3 retains the lens information regarding the lens used in the optical system of the capture device 2 at the time of the last performance of the processing illustrated in FIG. 21.

Thus, based on the lens information acquired at step S21 and the lens information retained in the image processing device 3, the statistical-model selection module 34 determines whether the lens information regarding the target lens 21 (namely, the focal length, the f-number, and the focal point) has been changed (step S22). In a case where at least one of the focal length, the f-number, and the focal point, or any combination thereof can be acquired as the lens information, based on such information acquired as the lens information, the statistical-model selection module 34 may determine whether the lens information regarding the target lens 21 has been changed.

In a case where it is determined that the lens information regarding the target lens 21 has been changed (YES at step S22), the statistical-model selection module 34 determines whether to use the lens information (catalog values of the target lens 21) acquired at step S21, for selection of the statistical model (step S23). Note that, use of the lens information for selection of the statistical model enables reduction of the processing amount of the statistical-model selection module 34. However, depending on the reliability of the lens information, an appropriate statistical model is unlikely to be selected. Thus, for example, the user previously sets whether the lens information is to be used for selection of the statistical model.

In a case where it is determined that no lens information is to be used for selection of the statistical model, based on the setting of the user (NO at step S23), the statistical-model selection module 34 estimates the aberration map (PSF shape) of the target lens 21 from an image captured by the capture device 2 with the target lens 21 (hereinafter, referred to as a sample image) (step S24).

Here, the sample image for use at step S24 is an image acquired by capturing of a test pattern, such as a white-dot image or white-and-black stripes, (test-pattern image). The statistical-model selection module 34 extracts the bokeh (PSF shape) occurring at each position in such a sample image, to estimate the aberration map of the target lens 21. For example, the sample image may be retained in the memory included in the lens module or may be retained in the image processing device 3 after capturing by the capture device 2.

Note that, at step S24, the aberration map of the entirety of the sample image may be estimated or the aberration map of a partial region of the sample image may be estimated. In a case where the aberration map of a partial region of the sample image is estimated, the partial region may correspond to the ranging region selected at step S12 illustrated in FIG. 21 or may be near the end portion of the sample image in which the bokeh having a distinctive shape occurs.

Next, the statistical-model selection module 34 collates the aberration map of the target lens 21 estimated at step S24, with each of the aberration maps stored in the aberration-map storage 32 (step S25). At step S25, the statistical-model selection module 34 calculates the degree of similarity between the aberration map of the target lens 21 and each of the aberration maps stored in the aberration-map storage 32, and then specifies an aberration map high in the degree of similarity.

Note that the aberration map is specified by performance of the processing at steps S24 and S25. However, for example, the aberration map may be specified with a first sample image (image including the bokeh) affected by the aberration of the optical system (target lens 21) of the capture device 2 and a second sample image (image including no bokeh) having less aberration acquired by reduction of the quantity of light to be taken in the capture device 2 (namely, by reduction of the size of the aperture). Specifically, the degree of similarity between the first sample image (defocused image) and an image generated by convolution of each of the aberration maps stored in the aberration-map storage 32 to the second sample image may be calculated.

According to this, the aberration map used in generation of the image high in the degree of similarity (aberration map convolved in the image) may be specified.

Here, each of the aberration maps stored in the aberration-map storage 32 is linked with the statistical model as described above. Thus, the statistical-model selection module 34 selects the statistical model linked with the aberration map specified as described above, from the plurality of statistical models stored in the statistical-model storage 31 (step S26). The statistical model selected at step S26 corresponds to the statistical model enabling estimation of the distance with high accuracy to the captured image captured by the capture device 2 with the target lens 21. Also, the selected statistical model is set in the image processing device 3 as the statistical model corresponding to the target lens 21 (lens information (e.g., the focal length, the f-number, and the focal point)).

After performance of the processing at step S26, the distance acquisition module 38 inputs the information regarding the ranging region (gradient data) in the captured image acquired at step S13 illustrated in FIG. 21, into the statistical model selected at step S26 (step S27).

After performance of the processing at step S27, the distance to the subject in the ranging region is estimated in the statistical model, so that the statistical model outputs the estimated distance. Note that the distance to the subject is estimated every pixel of the ranging region (captured image) and then is output. Thus, the distance acquisition module 38 acquires the distance information indicating the distance output from the statistical model (step S28).

Note that the statistical model selected at step S26 (namely, the statistical model set in the image processing device 3 as the statistical model corresponding to the target lens 21) is used every time the processing of FIG. 22 is performed as long as the target lens 21 is not changed to the other lens.

That is, in a case where it is determined at step S22 that the lens information regarding the target lens 21 has not been changed (NO at step S22), the processing at steps S27 and S28 is performed with the already set statistical model (namely, the statistical model selected by the last performance of the processing of FIGS. 21 and 22).

Meanwhile, in a case where it is determined at step S23 that the lens information is to be used for selection of the statistical model (YES at step S23), the statistical-model selection module 34 selects the statistical model corresponding to the lens (namely, the target lens 21) specified based on the lens information (e.g., the focal length, the f-number, and the focal point), from the plurality of statistical models stored in the statistical-model storage 31 (step S26). After performance of the processing at step S26, the processing at steps S27 and S28 is performed.

Note that, in a case where a plurality of ranging regions is selected at step S12 illustrated in FIG. 21, the processing at steps S27 and S28 illustrated in FIG. 22 is performed every ranging region. Thus, the distance information indicating the distance to the subject included in each of the plurality of ranging regions can be acquired. For example, in a case where a plurality of ranging regions is selected from different captured images, the processing at and after step S13 illustrated in FIG. 21 needs to be performed every captured image.

In the example illustrated in FIG. 22, the description has been given in which the processing at step S26 is performed in a case where the statistical model is selected with the lens information. For example, in some cases, ray tracing with the lens information (the focal length, the f-number, and the current focal point) enables simulation of the bokeh (PSF shape) that occurs in the image captured by the capture device 2 with the target lens 21. In such a case, processing corresponding to that at step S25 may be performed with the aberration map estimated based on a result of the simulation, for selection of the statistical model.

In the example illustrated in FIG. 22, the description has been given in which the processing at steps S24 and S25 is performed in a case where it is determined at step S23 that no lens information is to be used for selection of the statistical model. For example, in a case where the lens information cannot be acquired, the processing at steps S24 and S25 may be performed.

For example, even in a case where it is determined at step S23 that the lens information is to be used for selection of the statistical model, in some cases, there is no statistical model coinciding with the lens information acquired at step S21. In such a case, the processing at steps S24 and S25 may be performed for selection of the statistical model linked with the aberration map highest in the degree of similarity.

Furthermore, in some cases, aberration information corresponding to the aberration map of the target lens 21, can be acquired from the manufacturer of the target lens 21 (lens maker). In this case, processing corresponding to that at step S25 may be performed with the aberration information, for selection of the statistical model.

With the set values of the focal length, the f-number, and the focal point set manually by the user, the processing at step S26 may be performed.

As described above, in the present embodiment, the statistical model generated by learning of the bokeh that occurs in the image for learning (first image) affected by the aberration of the optical system (first optical system) and varies non-linearly in accordance with the distance to the subject in the image for learning, is stored in the statistical-model storage 31 every lens for use in the optical system. In a case where the captured image (second image) affected by the aberration of the optical system (second optical system) is acquired, the captured image is input into the statistical model corresponding to the target lens 21 used in the optical system at the time of capturing of the captured image. Therefore, the distance information indicating the distance to the subject in the captured image is acquired.

Note that, in the present embodiment, examples of the bokeh that varies non-linearly in accordance with the distance to the subject in the image include at least one of the bokeh that occurs due to the chromatic aberration of the optical system. Also, examples of the bokeh include the bokeh that occurs in accordance with the size or shape of the aperture of the diaphragm mechanism that adjusts the quantity of light to be taken in the optical system. Furthermore, examples of the bokeh varying non-linearly in accordance with the distance to the subject in the image may further include the bokeh that varies in accordance with position in the image. Note that, in the present embodiment, the chromatic aberration has been mainly described as the aberration of the optical system. The statistical model for use in the present embodiment may learn the bokeh that occurs due to other aberration (namely, may estimate the distance based on the bokeh that occurs due to other aberration). In the present embodiment, for example, the distance can be estimated even with monochromatic aberration that occurs in a monochrome image. However, use of a color image having chromatic aberration enables improvement of the accuracy of estimation of the distance.

That is, in the present embodiment, focusing on the point that the bokeh that occurs in the image has the distance dependence and the positional dependence and varies in accordance with the lens (type) used in the optical system of the capture device 2, with the statistical model corresponding to the target lens 21 used in the capture device 2 (optical system) by which the image to be captured is captured, the distance information indicating the distance to the subject in the captured image is acquired. Thus, the accuracy for the distance (accuracy of estimation) can be improved.

Furthermore, in the present embodiment, the lens information regarding the target lens 21 is acquired, and then the statistical model corresponding to the lens (target lens 21) specified based on the lens information is selected from the plurality of statistical models stored in the statistical-model storage 31. Note that the lens information can be acquired from the lens module (memory). Such a configuration enables acquisition of the distance information with the statistical model appropriately corresponding to the target lens 21. Such use of the lens information enables reduction of the processing amount for selection of the statistical model.

Meanwhile, in a case where no lens information is used, an aberration map stored in the aberration-map storage 32 is specified, based on the bokeh occurring in the sample image (fourth image) affected by the aberration of the optical system of the capture device 2. The distance information is acquired with the statistical model corresponding to the specified aberration map (namely, the statistical model linked with the aberration map).

Specifically, for example, the sample image includes a test-pattern image, and the aberration map (second aberration map) estimated based on the bokeh occurring in the test-pattern image is collated with each of the aberration maps (first aberration maps) stored in the aberration-map storage 32. According to this, an aberration map (first aberration map) similar to the estimated aberration map (second aberration map) is specified.

Such a configuration causes the processing amount larger than that in the use of the lens information, but is likely to enable more appropriate selection of the statistical model based on the sample image captured practically by the capture device 2 than selection of the statistical model simply with the lens information.

Note that, by comparison between the first sample image (fourth image) affected by the aberration of the optical system of the capture device 2 and the image (sixth image) generated by convolution of each of the aberration maps stored in the aberration-map storage 32 to the second sample image (fifth image) less affected by the aberration of the optical system than the first sample image, the aberration map convolved in the image similar to the first sample image may be specified.

At the time of specification of the aberration map as described above, the bokeh occurring in the entirety of the sample image may be used or the bokeh occurring in a partial region of the sample image may be used. In other words, the aberration map may be specified focusing on the bokeh occurring in the entirety of the sample image or the aberration map may be specified focusing on the bokeh occurring in a partial region of the sample image. Use of the bokeh occurring in the entirety of the sample image enables more appropriate specification of the aberration map, whereas use of the bokeh occurring in a partial region of the sample image enables reduction of the processing amount at the time of specification of the aberration map. For example, the partial region of the sample image in this case may correspond in position to the selected ranging region or may be near the end portion of the sample image in which the bokeh having a more distinctive shape occurs in accordance with the target lens 21.

Furthermore, in the present embodiment, the preview display in which the captured images captured by the capture device 2 are sequentially displayed, is performed. The ranging region is selected from the captured image being displayed. Then, the distance information indicating the distance to the subject in the selected ranging region, is acquired.

Note that the ranging region may be selected based on an operation of the user to a button physically provided to the capture device 2 (or the ranging device 1), such as the shutter button. Also, the ranging region may be selected based on an operation of the user to the captured image displayed on the touch-screen display (e.g., an operation of touching the position of the ranging region). Furthermore, the ranging region may be a region including the subject extracted by predetermined image processing based on, for example, the autofocus function.

Such a configuration enables acquisition of the distance information indicating the distance to the subject at which the user aims. In addition, in a case where the ranging region is a partial region in the captured image, the distance information indicating the distance to the entire subject included in the entirety of the captured image does not need to be acquired, resulting in reduction of the processing amount of the image processing device 3. Note that, in a case where the ranging region is the entirety of the captured image (entire region), the distance information indicating the distance to the entire subject included in the captured image, can be acquired.

Here, in the present embodiment, the distance information indicating the distance to the subject is acquired, based on the bokeh occurring in the captured image captured by the capture device 2. However, for example, in a case where the size of the bokeh is 10 pixels or more, the distance information is unlikely to be acquired.

Thus, as a measure against a case where the distance information cannot be acquired due to the size of the bokeh, for example, the distance acquisition module 38 performs processing illustrated in FIG. 23. Specifically, the distance acquisition module 38 determines whether the size of the bokeh occurring in the ranging region of the captured image is in an allowable range (step S31). At step S31, in a case where the size of the bokeh occurring in the ranging region is a predetermined value (e.g., 10 pixels) or more, the distance acquisition module 38 determines that the size of the bokeh is out of the allowable range. Meanwhile, in a case where the size of the bokeh occurring in the ranging region is less than the predetermined value, the distance acquisition module 38 determines that the size of the bokeh is in the allowable range.

In a case where it is determined that the size of the bokeh is out of the allowable range (NO at step S31), the distance acquisition module 38 reduces the resolution of the captured image (ranging region) (step S32). In a case where the resolution of the captured image is reduced (lowered), the size (number of pixels) of the bokeh occurring in the ranging region of the captured image can be reduced so as to be in the allowable range.

After performance of the processing at step S32, the processing at step S27 illustrated in FIG. 22 is performed with the captured image reduced in resolution at step S32.

Meanwhile, in a case where it is determined that the size of the bokeh is in the allowable range (YES at step S31), the processing at step S32 is not performed.

Herein, the description has been given in which the processing at step S32 is performed in a case where the size of the bokeh occurring in the ranging region of the captured image is the predetermined value or more. However, for example, in a case where the edge cannot be extracted in the captured image (ranging region), the size of the bokeh may be estimated to be large and then the processing at step S32 is performed.

The processing of FIG. 23 needs to be performed at any timing after performance of the processing at step S13 illustrated in FIG. 21 but before performance of the processing at step S27 illustrated in FIG. 22.

Note that, in the present embodiment, the description has been given in which the statistical model is generated (prepared) every lens for use in the optical system of the capture device 2. For example, one statistical model to a plurality of lenses may be generated in the statistical-model storage 31 (e.g., the statistical model having learned an image captured with each of a plurality of lenses).

Here, for example, there is distance estimation with a statistical model having learned with bokeh information regarding an entire image and semantic information. In this case, minute bokeh information is unavailable. Furthermore, a huge amount of learning data is required for environmental robustness (namely, for allowing distance estimation with high accuracy from various captured images).

In contrast to this, in the present embodiment, the statistical model learns the bokeh that occurs in the image. Thus, the robustness at the time of acquisition of the distance (distance information) from the captured image can be improved (namely, higher robustness can be achieved) in comparison with the learning with the bokeh information and the semantic information as described above.

For distance estimation with a single-eye camera, there is provision of a filter to the aperture of the camera (namely, an addition is made to the lens of the camera). However, such a configuration causes the filter to deteriorate the transmittance of light, so that an imbalance occurs easily in color balance. Furthermore, an increase in the number of components, such as a filter, causes an increase in cost.

In contrast to this, in the present embodiment, no deterioration occurs in the transmittance of light and no imbalance occurs in color balance. Furthermore, no increase is made in cost.

In the present embodiment, in a case where the statistical model learns the bokeh every local region extracted from the image, the statistical model enabling estimation of the distance with high accuracy from the captured image, can be generated. In this case, input of the information regarding the local region extracted from the captured image into the statistical model enables, every local region, acquisition of the distance information indicating the distance to the subject in the local region.

Note that, for example, the information regarding the local region includes the information indicating the difference in pixel value between each pixel and a pixel adjacent thereto in the local region. However, other information may be used as the information regarding the local region.

Specifically, as the information regarding the local region, the positional information regarding the local region in the image may be further input into the statistical model. Such a configuration enables acquisition of the distance information with higher accuracy with the position of the local region taken in consideration. Note that, for example, the positional information indicates the coordinates of the central point of the local region on the captured image, but may indicate other information.

Herein, the description has been given in which the statistical model learns the bokeh every local region extracted from the image. However, in a case where the statistical model collectively learns the bokeh in the entire region of the image for learning and then the bokeh in the entire region of the captured image is input into the statistical model for estimation of the distance, the operation load of the image processing device 3 (distance acquisition module 38) can be reduced.

Note that the description has been given in which the statistical model in the present embodiment includes, for example, a neural network or a random forest. However, a different algorithm may be applied to the statistical model.

Next, an image processing device 3 according to a modification of the present embodiment will be described. In the following description, parts similar to those in the drawings used in the description of the present embodiment are denoted with the same reference signs and the descriptions thereof will be omitted. Thus, the difference from the present embodiment will be mainly described.

First, an outline of the present modification will be described with reference to FIG. 24. As illustrated in FIG. 24, in the present modification, at the time of estimation of a distance 504 by a statistical model from information regarding a captured image 501, the degree of uncertainty (hereinafter, referred to as the uncertainty level) 701 of the estimation is calculated every pixel. According to this, the uncertainty level 701 is output together with the distance 504 from the statistical model. The method of calculating the uncertainty level 701 is not limited to a specific method, and thus various known methods can be applied as the method of calculating the uncertainty level 701.

In the present modification, a distance acquisition module 38 examines the uncertainty level output from the statistical model, and then discards, in a case where the uncertainty level is a threshold or more, for example, acquired distance information (namely, distance information indicating the distance at an uncertainty level of the threshold or more). Note that, for example, the distance information arranged at the position corresponding to the pixel from which the distance indicated from the distance information is estimated, is output (namely, output in map format). In a case where the distance information is discarded, a value indicating that the distance (distance information) estimated by the statistical model is invalid, is arranged at the position corresponding to the pixel from which the distance is estimated.

In a case where the uncertainty level to the distance estimated based on a specific pixel is the threshold value or more, the distance acquisition module 38 can correct the distance with the distance estimated based on a peripheral pixel of the pixel (distance at an uncertainty level less than the threshold). In the correction, for example, the average value of the respective distances estimated based on peripheral pixels may be used as a correction value, or the correction value may be determined by majority voting with the distances.

FIG. 25 illustrates an exemplary learning method of the statistical model in the present modification. As illustrated in FIG. 25, in the present modification in which the statistical model outputs the uncertainty level, basically, information regarding an image for learning 601 is input into the statistical model, and then the error between a distance 602 estimated by the statistical model and a correct value 603 is fed back to the statistical model. Note that, in the statistical model in which the information regarding the image for learning 601 is input, an uncertainty level 702 is calculated to the distance 602 estimated as described above. Thus, in the present modification, the error between the distance 602 and the correct value 603, divided by the square of the uncertainty level 702, is fed back. In this case, because the error is zero when the uncertainty level 702 is infinite, the square of the uncertainty level 702 is added as a penalty to the error.

In the present modification, a parameter of the statistical model (e.g., a weight coefficient) is updated such that the value of the error between the distance 602 and the correct value 603, corrected with the uncertainty level 702, is reduced.

Here, for example, in a case where there is no error between the distance 602 estimated by the statistical model and the correct value 603 but the uncertainty level 702 is high, it can be presumed that the distance 602 has been estimated probably accidentally. In this case, it can be recognized that the learning of the distance 602 (correct value 603) is insufficient.

In the present modification, use of the uncertainty level calculated by the statistical model enables reduction of such insufficient learning.

Note that the learning method described in FIG. 25 is applied to each statistical model stored in a statistical-model storage 31.

The operation of the image processing device 3 according to the present modification will be described below. Note that processing of generating the statistical model for use in the image processing device 3 according to the present modification, is similar to the processing illustrated in FIG. 20 except that the error corrected with the uncertainty level is used, and thus the detailed description thereof will be omitted.

Herein, a procedure of the image processing device 3 at the time of acquisition of the distance information from the captured image will be described. In the present modification, processing different from the processing illustrated in FIG. 21 in terms of the processing at step S14 (distance acquisition processing) illustrated in FIG. 21, is performed.

An exemplary procedure of distance acquisition processing to be performed in the image processing device 3 according to the present modification, will be described with reference to a flowchart illustrated in FIG. 26.

First, the processing at steps S41 to S47 corresponding to the processing at steps S21 to S27 illustrated in FIG. 22 is performed.

In the present modification, after performance of the processing at step S47, the distance to the subject is estimated and the uncertainty level (degree of uncertainty) to the distance is calculated by the statistical model. Note that the distance to the subject and the uncertainty level are output from the statistical model every pixel of the captured image (ranging region).

Thus, the distance acquisition module 38 acquires the distance information indicating the distance and the uncertainty level, output from the statistical model, every pixel of the ranging region in the captured image (step S48).

Next, the processing at steps S49 and S50 is performed on each piece of distance information acquired at step S48 (namely, the distance information based on each pixel). In the following description, the distance information to be subjected to the processing at steps S49 and S50 is defined as target distance information, and the uncertainty level to the distance indicated from the target distance information, is defined as a target uncertainty level. Furthermore, the pixel in the ranging region of the captured image, from which the distance indicated from the target distance information is estimated (output) in the statistical model, is defined as a target pixel.

In this case, the distance acquisition module 38 determines whether the target uncertainty level is the threshold or more (step S49).

In a case where it is determined that the target uncertainty level is the threshold or more (YES at step S49), the distance acquisition module 38 specifies, from the distance information for each pixel at step S48, the distance information which indicates the distance estimated based a pixel located around the target pixel in the captured image (hereinafter, referred to as a peripheral pixel) and in which the uncertainty level to the distance indicated from the distance information is less than the threshold. The number of pieces of distance information to be specified here may be at least two or one. The distance acquisition module 38 corrects the distance indicated from the target distance information, with the distance indicated from the specified distance information (step S50). In a case where no distance information at an uncertainty level less than the threshold is present in the pieces of distance information indicating distances estimated based on peripheral pixels, for example, the distance indicated from the target distance information is set to a predetermined unfixed value.

Note that, in a case where a plurality of pieces of distance information is specified, for example, the distance indicated from the target distance information may be corrected with the average value of the respective distances indicated from the plurality of pieces of distance information (namely, the distances based on the peripheral pixels). Also, the distance may be corrected based on majority voting with the distances indicated from the plurality of pieces of distance information. In a case where one piece of distance information is specified, the distance indicated from the target distance information may be corrected based on the distance indicated from the one piece of distance information.

Meanwhile, in a case where it is determined that the target uncertainty level is not the threshold or more (namely, less than the threshold) (NO at step S49), the processing at step S50 is not performed.

Next, it is determined whether the processing at steps S49 and S50 has been performed on all the distance information acquired at step S48 (step S51).

In a case where it is determined that the processing has not been performed on all the distance information (NO at step S51), the processing goes back to step S49 for repetition. In this case, as the target distance information, the distance information to which the processing at steps S49 and S50 has not been performed, is subjected to the processing.

Figure 26:
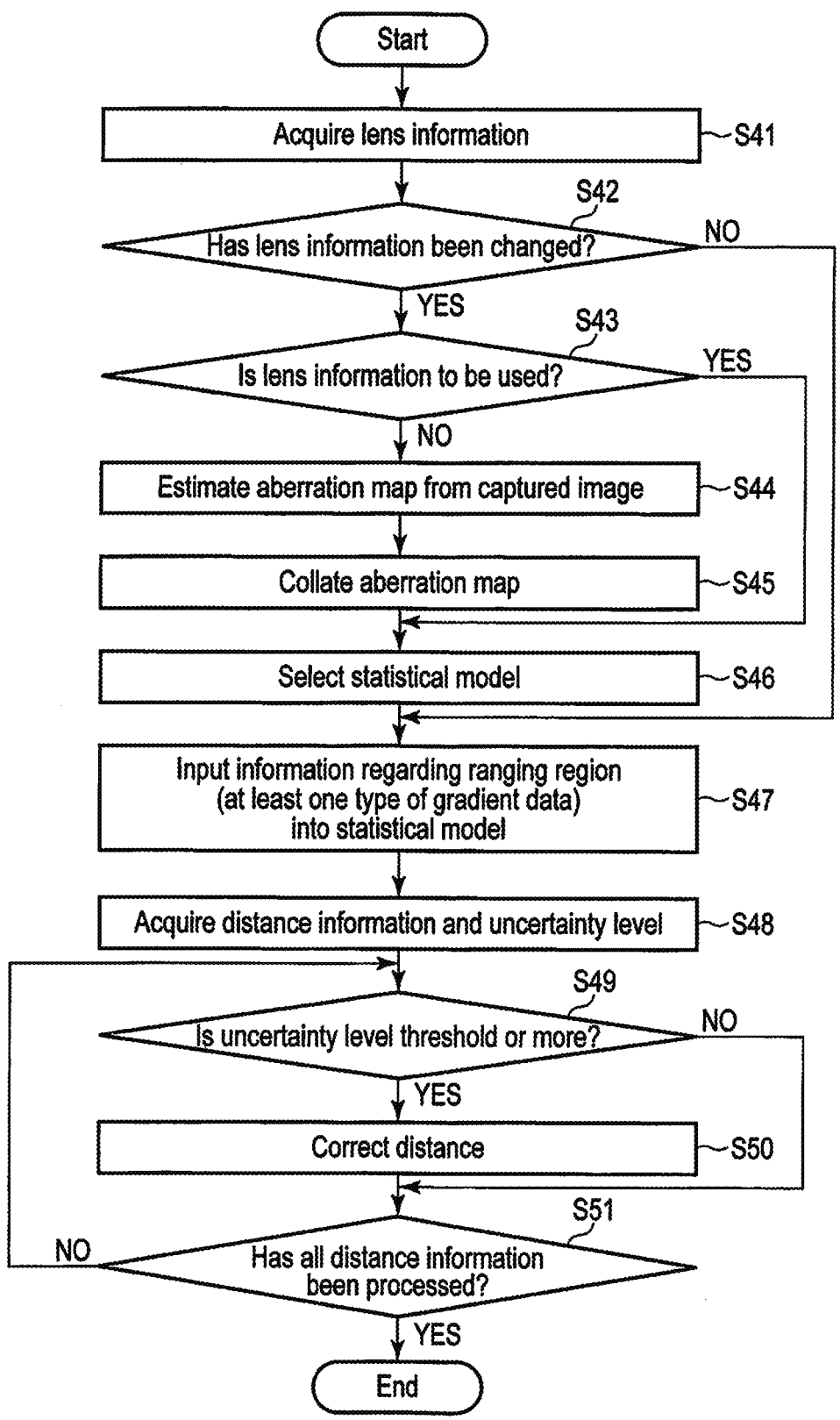
FIG. 26 is a flowchart of an exemplary procedure of an image processing device.

Meanwhile, in a case where it is determined that the processing has been performed on all the distance information (YES at step S51), the distance acquisition processing illustrated in FIG. 26 is ended.

Note that, in the example illustrated in FIG. 26, the description has been given in which the distance at an uncertainty level of the threshold or more is corrected with the distance estimated based on a peripheral pixel. However, the distance information indicating the distance at an uncertainty level of the threshold or more may be discarded so as not to be output by an output module 39.

As described above, in the present modification, use of the uncertainty level calculated in the statistical model enables prevention of the distance at an uncertainty level of the threshold or more (namely, the distance estimated probably accidentally and having a high degree of uncertainty) from being used as it is.

(Exemplary Applications)

Exemplary applications to which a ranging system 1 having a configuration as in the embodiment or the modification described above is applied, will be described. Herein, for convenience, the ranging system 1 achieved as one device (ranging device) including an image capturing module corresponding to the capture device 2 and an image processing module corresponding to the image processing device 3, illustrated in FIG. 1, will be described. In the following drawings, the ranging device 1 including the image capturing module 2 and the image processing module 3, will be described.

FIG. 27 illustrates an exemplary functional configuration of a mobile object 800 in which the ranging device 1 is incorporated. For example, the mobile object 800 can be achieved as an automobile, an unmanned aerial vehicle, or an autonomous mobile robot having a self-driving function. The unmanned aerial vehicle that is an airplane, a rotorcraft, a glider, or an airship that nobody can board, can fly under remote control or on autopilot. Examples of the unmanned aerial vehicle include a drone (multicopter), a radio-controlled airplane, and a crop-dusting helicopter. Examples of the autonomous mobile robot include a mobile robot like an automated guided vehicle (AGV), a cleaning robot that cleans floors, and a communication robot that guides visitors variously. Examples of the mobile object 800 include not only a robot itself movable, but also an industrial robot having a driving mechanism of moving or rotating part of a robot like a robot arm.

As illustrated in FIG. 27, for example, the mobile object 800 includes the ranging device 1, a control-signal generation module 801, and a driving mechanism 802. For example, the ranging device 1 is provided so that the image capturing module 2 can capture a subject in the travel direction of the mobile object 800 or part thereof.

As illustrated in FIG. 28, in a case where the mobile object 800 is an automobile 800A, the ranging device 1 is provided as a so-called front camera for front capturing. Note that the ranging device 1 may be provided as a so-called rear camera for rear capturing at the time of reversing. A plurality of ranging devices 1 may be provided as the front camera and the rear camera. Furthermore, the ranging device 1 also serving as a so-called drive recorder, may be provided. That is, the ranging device 1 may be a video recorder.

Figure 29:
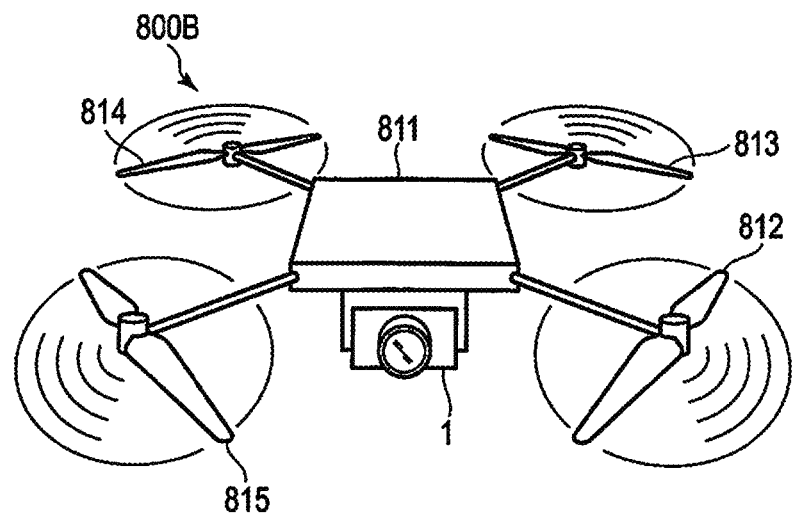
FIG. 29 explanatorily illustrates the mobile object that is a drone.

FIG. 29 exemplifies the mobile object 800 that is a drone 800B. The drone 800B includes a drone body 811 corresponding to the driving mechanism 802 and four propeller units 812 to 815. The propeller units 812 to 815 each include a propeller and a motor. Transmission of the driving of the motor to the propeller causes the propeller to rotate, so that the drone 800B floats due to the lift of the rotation. For example, the ranging device 1 is mounted at the lower part of the drone body 811.

Figure 30:
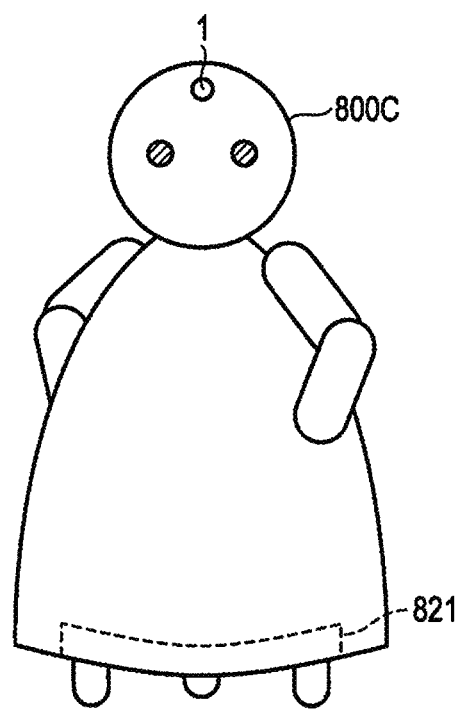
FIG. 30 explanatorily illustrates the mobile object that is an autonomous mobile robot.

FIG. 30 exemplifies the mobile object 800 that is an autonomous mobile robot 800C. The mobile robot 800C has a lower portion provided with a power unit 821 including a motor and wheels, corresponding to the driving mechanism 802. The power unit 821 controls the number of revolutions of the motor and the orientations of the wheels. Rotation of the wheels in contact with a road surface or a floor surface, due to transmission of the driving of the motor, and control of the orientations of the wheels enable the mobile robot 800C to move in any direction. In the example illustrated in FIG. 30, for example, the ranging device 1 is provided at the head portion of the humanoid mobile robot 800C such that the image capturing module 2 performs front capturing with respect to the mobile robot 800C. Note that the ranging device 1 may be provided such that rear capturing, left capturing, or right capturing are performed with respect to the mobile robot 800C, or a plurality of ranging devices 1 may be provided such that a plurality of bearings is captured. The ranging device 1 provided in a compact robot having insufficient space to be equipped with, for example, a sensor, may estimate the self-position and attitude of the compact robot and the position of a subject and then dead reckoning may be performed.

Figure 31:
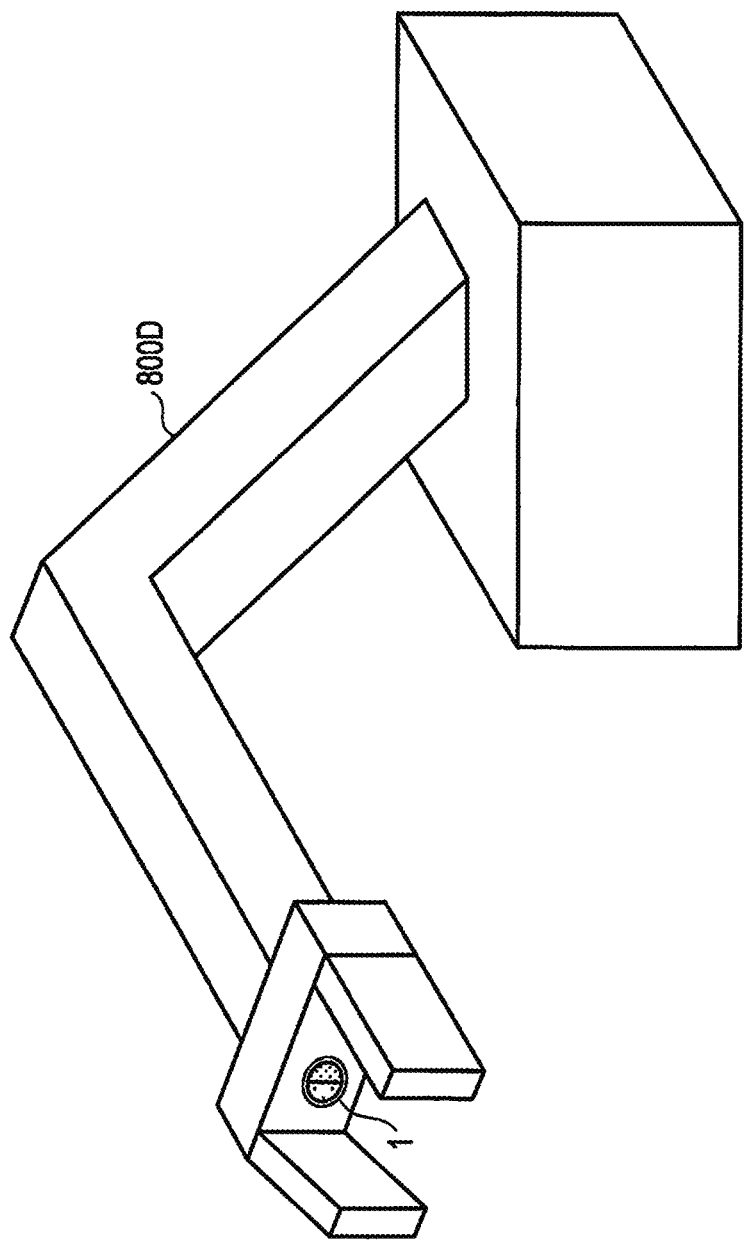
FIG. 31 explanatorily illustrates the mobile object that is a robot arm.

Note that, in a case where the mobile object 800 is a robot arm 800D as illustrated in FIG. 31 and movement and rotation of part of the robot arm 800D are controlled, for example, the ranging device 1 may be provided at the leading end of the robot arm 800D. In this case, the image capturing module 2 included in the ranging device 1 captures an object to be held by the robot arm 800D, so that the image processing module 3 can estimate the distance to the object to be held by the robot arm 800D. Thus, the robot arm 800D can operate to hold the object accurately.

The control-signal generation module 801 outputs a control signal for controlling the driving mechanism 802, based on the distance information indicating the distance to the subject output from the ranging device (image processing device 3). The driving mechanism 802 drives the mobile object 800 or part of the mobile object 800, based on the control signal output from the control-signal generation module 801. For example, for the mobile object 800 or part of the mobile object 800, the driving mechanism 802 performs at least one of movement, rotation, acceleration, deceleration, adjustment of thrust (lift), changing in travel direction, switching between normal-driving mode and self-driving mode (collision avoidance mode), and actuation of a safety device, such as an air bag. For example, in a case where the distance of the subject is less than a threshold, the driving mechanism 802 may perform at least one of movement, rotation, acceleration, adjustment of thrust (lift), changing in direction close to the subject, and switching from self-driving mode (collision avoidance mode) to normal-driving mode.

Note that, for example, the driving mechanism 802 of the automobile 800A illustrated in FIG. 28 includes the tires thereof. For example, the driving mechanism 802 of the drone 800B illustrated in FIG. 29 includes the propellers thereof. For example, the driving mechanism 802 of the mobile robot 800C illustrated in FIG. 30 includes the leg portion thereof. For example, the driving mechanism 802 of the robot arm 800D illustrated in FIG. 31 includes a supporting portion supporting the leading end provided with the ranging device 1.

The mobile object 800 may further include a speaker and a display into which the information regarding the distance to the subject (distance information) output from the ranging device 1 is to be input. The speaker and the display in connection with the ranging device 1 by wire or by wireless, output a sound and an image regarding the distance to the subject, respectively. Furthermore, for example, the mobile object 800 may include a light-emitting unit that receives the information regarding the distance to the subject output from the ranging device 1 and is capable of turning on and off light in accordance with the distance to the subject.

For example, in a case where the mobile object 800 is the drone 800B, at the time of preparation of a map (three-dimensional shapes of objects), structural examination of buildings and terrains, or inspection of cracks or electric-wire breakage, from the sky, an image of a target captured by the image capturing module 2 is acquired. According to this, it is determined whether the distance to the subject is the threshold or more. Based on a result of the determination, the control-signal generation module 801 generates a control signal for controlling the thrust of the drone 800B such that the distance to the target to be inspected is constant. Here, the thrust includes lift. Based on the control signal, the driving mechanism 802 operates the drone 800B, so that the drone 800B can fly in parallel to the target to be inspected. In a case where the mobile object 800 is a surveillance drone, a control signal for controlling the thrust of the drone may be generated such that the distance to an object to be surveyed remains constant.

Note that, for example, in a case where the mobile object 800 (e.g., the drone 800B) is used for maintenance inspection of various types of infrastructure (hereinafter, simply referred to as infrastructure), the image capturing module 2 captures an image of a part that requires repairing because of including a cracked part or a rusted part in the infrastructure (hereinafter, referred to as a part to be repaired). According to this, the distance to the part to be repaired can be acquired. In this case, use of the distance to the part to be repaired, enables calculation of the size of the part to be repaired from the image. Thus, for example, display of the part to be repaired onto a map indicating the entirety of the infrastructure, enables a maintenance inspector of the infrastructure to recognize the part to be repaired. Informing the maintenance inspector of the size of the part to be repaired in advance is effective in smooth performance of repairing.

At the time of flying of the drone 800B, an image captured by the image capturing module 2 toward the ground is acquired, and then it is determined whether the distance to the ground is the threshold or more. Based on a result of the determination, the control-signal generation module 801 generates a control signal for controlling the thrust of the drone 800B such that the altitude from the ground is identical to a specified altitude. Based on the control signal, the driving mechanism 802 operates the drone 800B, so that the drone 800B can fly at the specified altitude. In a case where the drone 800B is a crop-dusting drone, keeping the altitude of the drone 800B from the ground constant facilitates spraying agricultural chemicals uniformly.

In a case where the mobile object 800 is the automobile 800A or the drone 800B, at the time of regimental travelling of the automobile 800A or the time of cooperative flying of the drone 800B, the image capturing module 2 captures an automobile ahead or a peripheral drone. According to this, it is determined whether the distance to the automobile ahead or the peripheral drone is the threshold or more. Based on a result of the determination, the control-signal generation module 801 generates a control signal for controlling the speed of the automobile 800A or the thrust of the drone 800B such that the distance to the automobile ahead or the peripheral drone is constant. Based on the control signal, the driving mechanism 802 operates the automobile 800A or the drone 800B, so that the regimental travelling of the automobile 800A or the cooperative flying of the drone 800B can be easily performed.

Furthermore, in a case where the mobile object 800 is the automobile 800A, an instruction of a driver may be accepted through a user interface so that the driver of the automobile 800A can set (change) the threshold. Thus, the automobile 800A can travel at an inter-vehicle distance that the driver desires. In order to keep a safe inter-vehicle distance to the automobile ahead, the threshold may be changed in accordance with the speed of the automobile 800A. The safe inter-vehicle distance varies depending on the speed of the automobile 800A. Thus, the threshold can be set larger (longer) as the automobile 800A increases in speed.

In a case where the mobile object 800 is the automobile 800A, with a predetermined distance in the travel direction set as the threshold, a control signal for actuating a brake or actuating the safety device such as the air bag, may be generated at the time of appearance of an object at less than the threshold. In this case, the driving mechanism 802 is provided with the automatic brake and the safety device such as the air bag.

According to at least one of the embodiments described above, provided can be an image processing device, a ranging device, a method, and a storage medium that enable improvement of accuracy for distance to be acquired from an image.

Each of the various functions described in the present embodiment and the present modification may be achieved by a circuit (processing circuit). Examples of the processing circuit include a programmed processor, such as a central processing module (CPU). The processor executes a computer program (command group) stored in a memory, to perform each of the described functions. The processor may be a microprocessor including an electric circuit. Examples of the processing circuit include a digital signal processor (DSP), an application specific integrated circuit (ASIC), a microcontroller, a controller, and other electric-circuit components. The other components except the CPU described in the present embodiment each may be achieved by a processing circuit.

Because the various types of processing in the present embodiment can be achieved by a computer program, execution of the computer program installed on a computer through a computer-readable storage medium storing the computer program, enables easy achievement of an effect similar to that in the present embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device comprising:
   first storage configured to store a statistical model generated by learning of bokeh that occurs in a first image affected by aberration of a first optical system and varies non-linearly in accordance with a distance to a subject in the first image; and
   a processor configured to:
   acquire a second image affected by aberration of a second optical system; and
   input the acquired second image into the statistical model corresponding to a lens used in the second optical system and acquire distance information indicating a distance to a subject in the second image.

2. The image processing apparatus according to claim 1, wherein
   the bokeh that varies non-linearly in accordance with the distance to the subject in the first image further varies in accordance with position in the first image.

3. The image processing apparatus according to claim 1, wherein the processor is configured to:
   select a region for acquisition of the distance information in the second image; and
   acquire the distance information indicating the distance to the subject in the selected region.

4. The image processing apparatus according to claim 3, wherein
   the processor is configured to select the region, based on an operation of a user.

5. The image processing apparatus according to claim 3, wherein
   the processor is configured to select a region including a specific subject in the second image.

6. The image processing apparatus according to claim 1, wherein
   the first storage is configured to store the statistical model every lens for use in the first optical system.

7. The image processing apparatus according to claim 1, wherein
   the processor is configured to:
   acquire lens information regarding the lens used in the second optical system;
   select the statistical model corresponding to the lens specified based on the lens information, from the first storage; and
   input the second image into the specified statistical model and acquire the distance information indicating the distance to the subject in the second image.

8. The image processing apparatus according to claim 1, further comprising:
   a second storage configured to store, for the statistical model corresponding to each of the lenses for use in the first optical system, a first aberration map indicating a distribution of bokeh that occurs in a third image affected by the aberration of the first optical system with the lens and depends on a distance to a subject in the third image and position in the third image, wherein
   the processor is configured to:
   specify a first aberration map stored in the second storage, based on bokeh occurring in a fourth image affected by the aberration of the second optical system; and
   input the second image into the statistical model corresponding to the specified first aberration map and acquire the distance information indicating the distance to the subject in the second image.

9. The image processing apparatus according to claim 8, wherein
   the fourth image includes an image acquired by capturing of a predetermined text pattern, and
   the processor is configured to collate a second aberration map estimated based on the bokeh occurring in the fourth image, with each of the first aberration maps stored in the second storage, and specify a first aberration map similar to the second aberration map.

10. The image processing apparatus according to claim 8, wherein
    the processor is configured to compare the fourth image with a sixth image generated by convolution of each of the first aberration maps stored in the second storage to a fifth image less affected by the aberration of the second optical system than the fourth image, and specify the first aberration map convolved in the sixth image similar to the fourth image.

11. The image processing apparatus according to claim 8, wherein
    the processor is configured to specify a first aberration map, based on bokeh occurring in an entirety of the fourth image or bokeh occurring in a partial region of the fourth image.

12. The image processing apparatus according to claim 11, wherein
    the bokeh occurring in the partial region of the fourth image includes bokeh occurring in a region near an end portion of the fourth image.

13. The image processing apparatus according to claim 1, wherein
    the processor is configured to:
    display the second image;
    select a region in the displayed second image, in accordance with an operation of a user; and
    input information regarding the selected region, into the statistical model corresponding to the lens used in the second optical system, and acquire the distance information indicating the distance to the subject in the region.

14. A ranging device comprising:
    a capture device configured to capture an image;
    a first storage configured to store a statistical model generated by learning of bokeh that occurs in a first image affected by aberration of a first optical system of the image capturing module and varies non-linearly in accordance with a distance to a subject in the first image; and
    the processor configured to:
    acquire a second image affected by aberration of a second optical system of the capture device; and
    input the acquired second image into the statistical model corresponding to a lens used in the second optical system and acquire distance information indicating a distance to a subject in the second image.

15. A method to be performed by an image processing device including storage configured to store a statistical model generated by learning of bokeh that occurs in a first image affected by aberration of a first optical system and varies non-linearly in accordance with a distance to a subject in the first image, the method comprising:
    acquiring a second image affected by aberration of a second optical system; and
    inputting the acquired second image into the statistical model corresponding to a lens used in the second optical system and acquiring distance information indicating a distance to a subject in the second image.

* * * * *